United States Patent [19]

Shouji et al.

[11] Patent Number: 5,559,653
[45] Date of Patent: Sep. 24, 1996

[54] THIN FILM MAGNETIC HEAD HAVING A MULTILAYER UPPER CORE

[75] Inventors: Shigeru Shouji; Atsushi Toyoda, both of Hamamatsu, Japan

[73] Assignee: Yamaha Corporation, Hamamatsu, Japan

[21] Appl. No.: 349,163

[22] Filed: Dec. 2, 1994

[30] Foreign Application Priority Data

Dec. 10, 1993 [JP] Japan .................... 5-341376

[51] Int. Cl.⁶ ..................... G11B 5/147; G11B 5/17; G11B 5/187
[52] U.S. Cl. .................... 360/126; 360/122; 360/123
[58] Field of Search ..................... 360/113, 125, 360/126, 119, 122, 123

[56] References Cited

U.S. PATENT DOCUMENTS

| | | | |
|---|---|---|---|
| 4,550,353 | 10/1985 | Hirai et al. | 360/126 |
| 4,589,042 | 5/1986 | Anderson et al. | 360/125 |
| 4,716,484 | 12/1987 | Kaminaka et al. | 360/126 |
| 4,742,413 | 5/1988 | Schewe | 360/126 |
| 4,814,921 | 3/1989 | Hamakawa et al. | 360/126 |
| 4,819,112 | 4/1989 | Iwata et al. | 360/126 |
| 5,032,945 | 7/1991 | Argyle et al. | 360/126 |
| 5,047,886 | 9/1991 | Toyoda et al. | 360/126 |
| 5,126,907 | 6/1992 | Hamakawa et al. | 360/126 |
| 5,255,142 | 10/1993 | Williams et al. | 360/126 |
| 5,373,408 | 12/1994 | Bischoff et al. | 360/122 |
| 5,379,172 | 1/1995 | Liao | 360/126 |

*Primary Examiner*—Jefferson Evans
*Attorney, Agent, or Firm*—Loeb & Loeb LLP

[57] ABSTRACT

A thin film magnetic head includes a lower core portion provided on a substrate and having a pole portion, a magnetic gap layer provided on the lower core portion, an insulating layer provided on the magnetic gap layer, conduction coils provided in the insulating layer, an upper core portion provided on the insulating layer, and an overcoat layer provided on the upper core portion. The upper core portion has a pole portion of a reduced width and a non-pole portion having a top-forming portion and an inclined section-forming portion formed on an inclined section of the insulating layer. The inclined section-forming section is made of a plurality of layers and a core angle of an uppermost layer of the plurality of layers of the non-pole portion is set at an angle which is 120 degrees or larger and is smaller than about 180 degrees and a core angle of a lower layer or layers of the plurality of layers of the non-pole portion is set at an angle which is smaller than the core angle of the uppermost layer and is larger than about 60 degrees. In one aspect of the invention, a foremost end portion of the lower layer of the inclined section-forming portion is located rearwardly of a foremost end portion of the the uppermost layer.

20 Claims, 26 Drawing Sheets

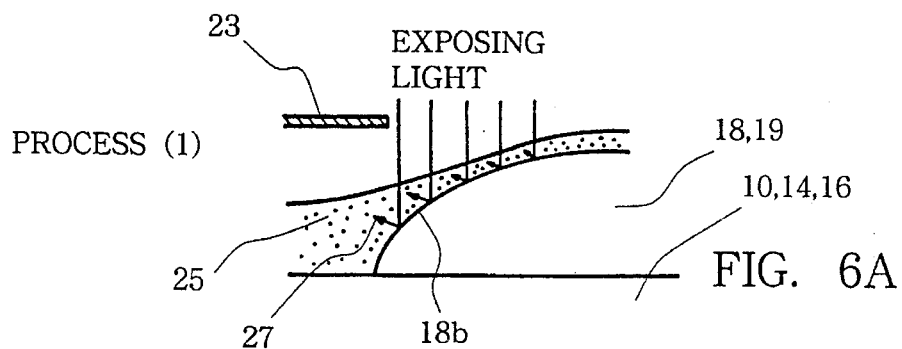
FIG. 6A PROCESS (1)
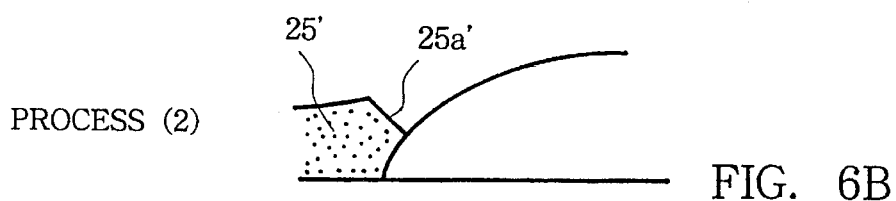
FIG. 6B PROCESS (2)
FIG. 6C PROCESS (3)
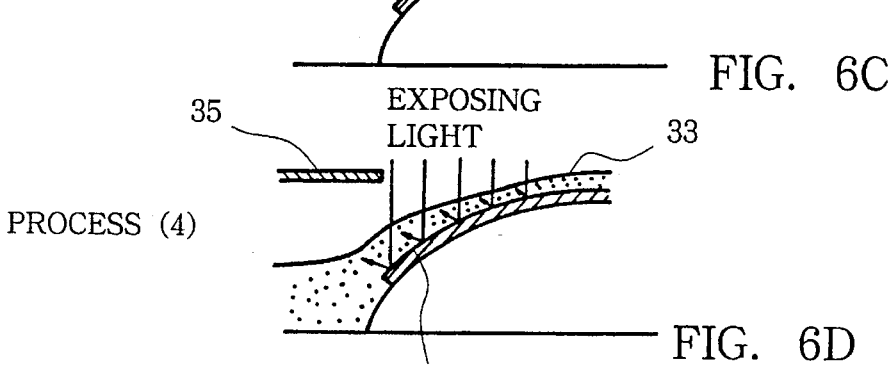
FIG. 6D PROCESS (4)
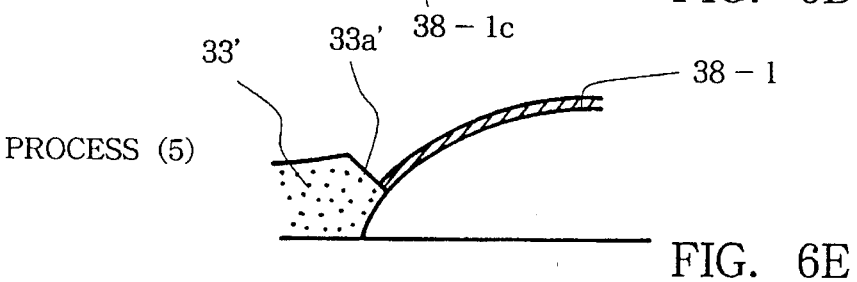
FIG. 6E PROCESS (5)
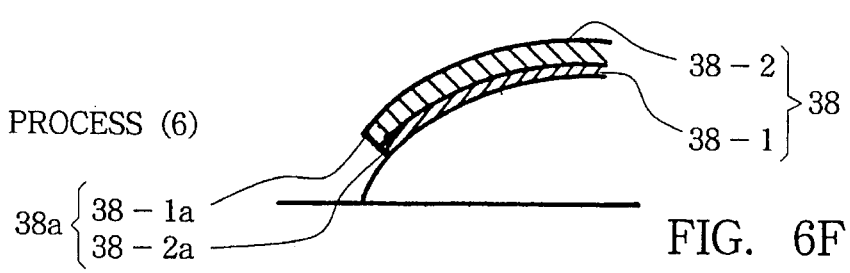
FIG. 6F PROCESS (6)

PROCESS (1)

PROCESS (2)

PROCESS (3)

PROCESS (4)

PROCESS (5)
A – A SECTION

PROCESS (5)
B – B SECTION

PROCESS (6)
A – A SECTION

PROCESS (6)
B – B SECTION (B—B SECTION)

(A – A SECTION)

PROCESS (1)

PROCESS (2)

PROCESS (3)

PROCESS (4)

PROCESS (5)

PROCESS (6)

PROCESS (7)

PROCESS (8)

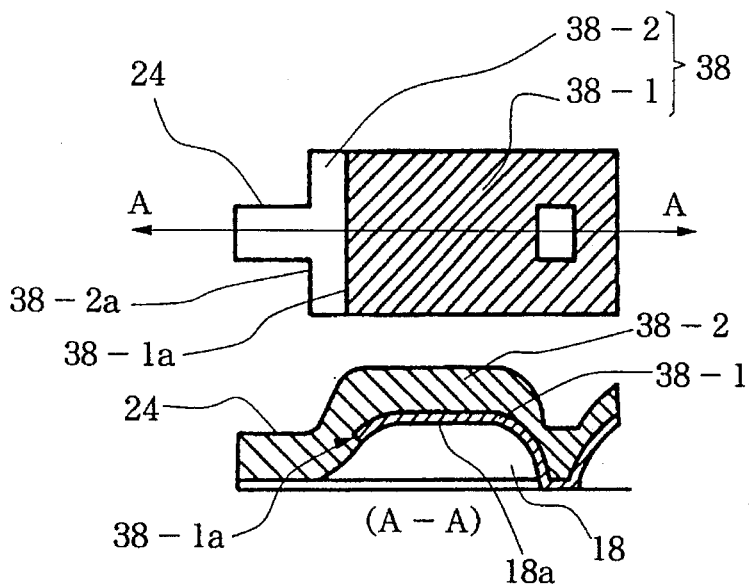
FIG. 19A
FIG. 19B
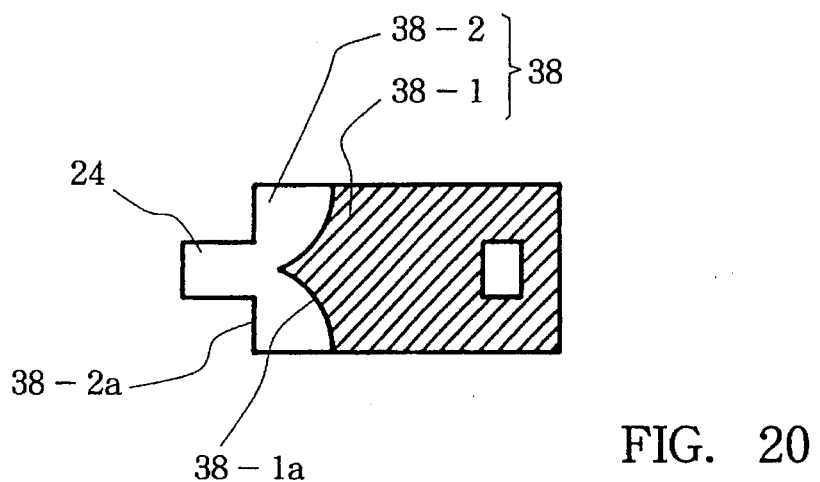
FIG. 20
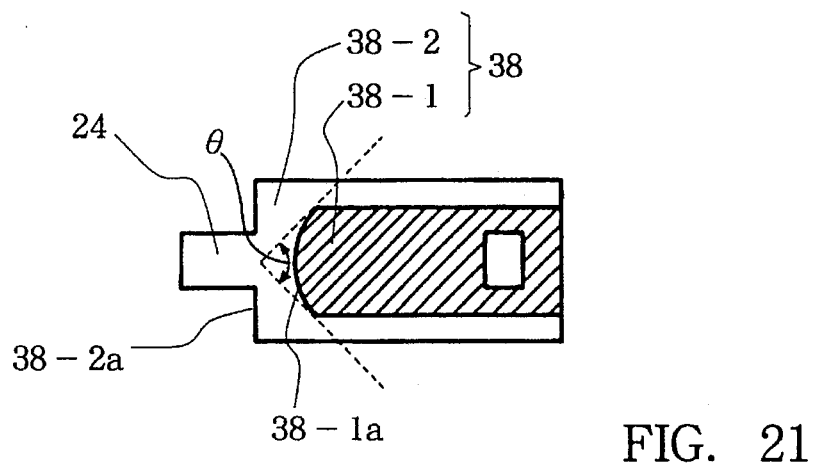
FIG. 21

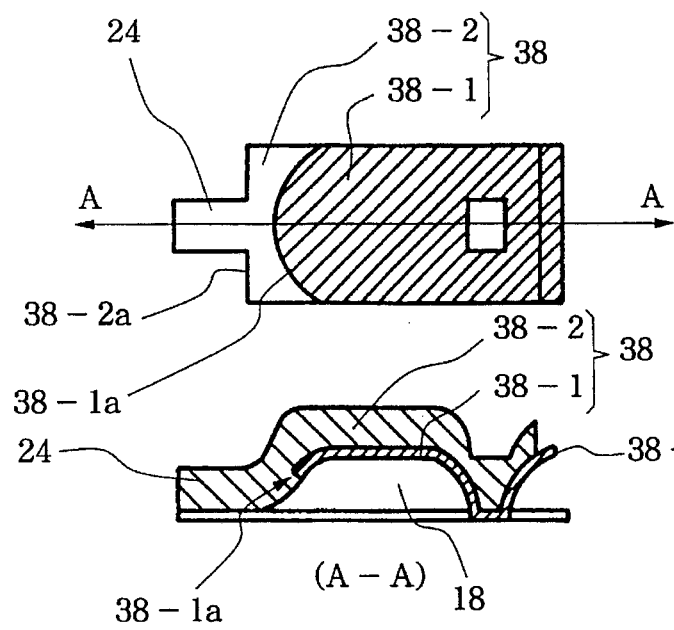
FIG. 25A
FIG. 25B
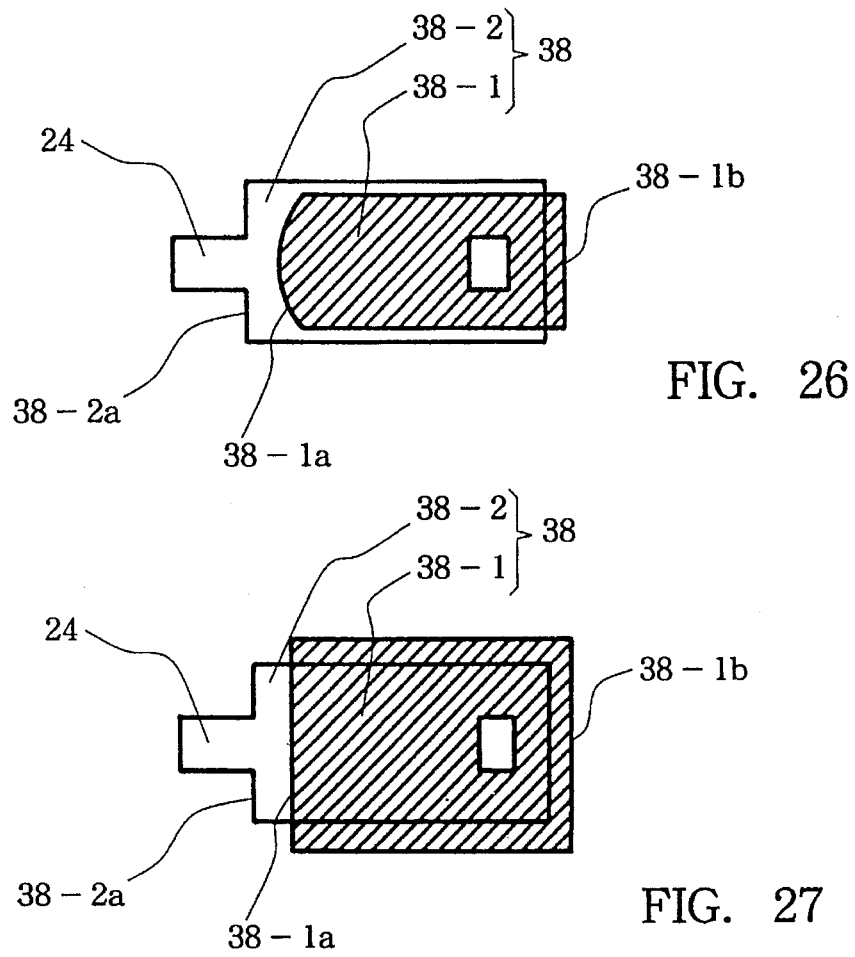
FIG. 26
FIG. 27

THIN FILM MAGNETIC HEAD HAVING A MULTILAYER UPPER CORE

FIELD OF THE INVENTION

This invention relates to a thin film magnetic head having a substantially rectangular upper core portion for reducing wiggle waveform distortion and popcorn noise (noise-after-write) and, more particularly, to a thin film magnetic head of this type capable of preventing occurrence of defects such as voids in an overcoat layer covering the upper core portion and thereby improving the yield in production of magnetic heads.

BACKGROUND OF THE INVENTION

A thin film magnetic head is used as recording and reproducing means in a magnetic disk device. A prior art thin film magnetic head used for a magnetic disk device is illustrated in FIGS. 1A and 1B. FIG. 1A is a front view and FIG. 1B is a cross-sectional view taken along arrows A—A in FIG. 1A. This thin film magnetic head 1 includes a clean mirror-surface slider substrate 10 which is made of, e.g., an $Al_2O_3$—TiC system ceramic plate. On this substrate 10 is deposited, by sputtering or other conventional methods, an undercoat layer 12 made of $SiO_2$, $Al_2O_3$ or the like having a thickness of 10 and several microns. A lower core portion 14 is provided on the undercoat layer 12 by electroplating, for example. A magnetic gap layer 16 is deposited by a sputtering method or the like on the lower core portion 14 to form a magnetic gap 17. Like the undercoat layer 12, the magnetic gap layer 16 is made of non-magnetic material, for example, of $SiO_2$, $Al_2O_3$ or the like.

On the magnetic gap layer 16 is provided a conduction coil and insulating layer 18. A positive-type photoresist is normally used as the insulating layer 18 which is hardened to a stable state by heating. Conduction coils of respective layers are made of Cu or the like and formed to a thickness of several microns by electroplating. On the conduction coil and insulating layer 18 is provided an upper core portion 20 by electroplating. On the upper core portion 20 is provided, by sputtering, an insulating overcoat layer 22 which is made of $SiO_2$, $Al_2O_3$ or the like and which covers the entire upper core portion 20.

A pole portion 26 of the lower core portion 14 is opposed to a pole portion 24 of the upper core portion 20 through the magnetic gap layer 16 and foremost end portions 24a and 26a of the pole portions 24 and 26 are coplanar and opposed to a recording surface of a magnetic disk (not shown). The upper core portion 20 of the prior art thin film magnetic head has a generally fan-like shape in section as shown in FIG. 1A.

Core portions of a thin film magnetic head are generally formed by depositing a soft magnetic film in a magnetic field which is parallel to an axis of easy magnetization (hereinafter referred to as an easy axis). The easy axis is formed to be parallel to a recording surface of a magnetic medium. As a result, in the upper core portion 20 of the prior art thin film magnetic head, parallel magnetic domains 28 and triangular magnetic domains 30 as shown in FIG. 2 are formed.

According to the structure of the upper core portion 20 having such magnetic field structure, when the thin film magnetic head is driven by a recording current (a recording mode) or voltage due to a magnetic field produced by a magnetic recording medium (reproduction mode), magnetization changes in a direction shown by arrows A in FIG. 2 and this causes rotation of a magnetization vector in the parallel magnetic domains 28 and displacement of magnetic walls 32 by change of the magnetic domains in the triangular magnetic domains 30. In this case, the rotation of the magnetization vector (spin) in the parallel magnetic domains 28 responds quickly to the change in magnetization but the change in the magnetic domains in the triangular magnetic domains 30 which causes the displacement of the magnetic walls 32 occurs with some delay. This delay causes a waveform distortion called a wiggle during reproduction of a recorded signal. On the other hand, interaction between the magnetic domain walls 32 and outer side walls 34 of the upper core portion 20 causes discharge of distortion energy stored in the magnetic domains with some delay from the change in magnetization and this delay often causes a sharp pulse-like noise called a popcorn noise (noise-after-write) in a reproduced signal.

For reducing such wiggle waveform distortion and popcorn noise, it is conceivable to increase a core angle θ and thereby reduce the areas of the triangular magnetic domains 30 so as to reduce influence of the triangular magnetic domains 30. In the present invention, the core angle θ is defined as an angle made between foremost lines of the outer side walls of the upper core portion 20. Increase in the core angle θ however brings about increase in the entire area of the upper core portion 20 which in turn causes an increase in leakage of flux between the upper core portion 20 and the lower core portion 14 with a resulting decrease in recording and reproduction efficiencies. The increase in the area of the upper core portion 20 causes also an increase in inductance which causes an increase in noise. This is particularly the case with a thin film magnetic head of a multiple winding type.

Therefore, the inventors of the present invention have previously proposed a thin film magnetic head which is capable of reducing the wiggle waveform distortion and popcorn noise without increasing the area of the upper core portion. In this thin film magnetic head, a laminated structure is provided on a substrate including a lower core portion, a magnetic gap layer of non-magnetic material, a conduction coil, an insulating layer and an upper core portion, a back region which commences from the back end of a pole region of the upper core portion and has a top-forming portion formed on the top of the insulating layer having outer side wall portions which are substantially parallel to a center axis of the pole portion and having a larger lateral width than the pole region, and a transition portion which is located between the top-forming portion and the pole region formed. The transition portion is formed on a slanted surface of the insulating layer. A core angle θ at the transition portion is set between 120 degrees and 180 degrees.

By providing the outer side walls of the upper core portion in parallel to the center axis of the pole region in the above-described manner, the areas of the triangular magnetic domains increase and this would seem to cause an increase in the wiggle waveform distortion and popcorn noise. According to experiments made by the inventors, however, it has been found that the wiggle waveform distortion and popcorn noise are actually reduced by forming the upper core portion in the above-described manner.

An example of the thin film magnetic head is shown in FIGS. 3A and 3B. In these figures, FIG. 3A is a plan view and FIG. 3B is a cross-sectional view taken along arrows A—A in FIG. 3A.

This thin film magnetic head 36 includes a clean mirror-surface slider substrate 10 which is made of, e.g., an $Al_2O_3$—TiC system ceramic plate. On this substrate 10 is deposited, by sputtering or other conventional methods, an undercoat layer (not shown) of $SiO_2$, $Al_2O_3$ or the like having a thickness of 10 and several microns. A lower core portion 14 is provided on the undercoat layer by electroplating, for example. A magnetic gap layer 16 is deposited by sputtering or the like on the lower core portion 14 to form a magnetic gap 17. Like the undercoat layer, the magnetic gap layer 16 is made of non-magnetic material, for example, of $SiO_2$, $Al_2O_3$ or the like.

On the magnetic gap layer 16 are provided conduction coils 19 and an insulating layer 18. A positive-type photoresist is normally used as the insulating layer 18 which is hardened to a stable state by heating. Conduction coils 19 of respective layers are made of conductive material such as Cu or the like and formed to a thickness of several microns by electroplating. On the conduction coil 19 and insulating layer 18 is provided an upper core portion 38 by electroplating. On the upper core portion 38 is provided, by sputtering, an overcoat layer 22 which is made of $SiO_2$, $Al_2O_3$ of the like and covers the entire upper core portion 20.

A pole portion 26 of the lower core portion 14 is opposed to a pole portion 24 of the upper core portion 38 through the magnetic gap layer 16, and foremost end portions 24a and 26a of the pole portions 24 and 26 are disposed to be opposed to a recording surface of a magnetic disk (not shown). The upper core portion 38 and the lower core portion 14 are connected to each other at a rear gap through hole 40.

The upper core portion 38 has the pole portion 24 formed at a skirt portion 44 of the insulating layer 18 and a back region 42 which starts from the back end of the pole region 24 and is formed symmetrically with respect to a center axis 46 of the pole portion 24. The back region 42 has a top portion 42a formed on the top of the insulating layer 18 and a transition portion 42b. Outer side walls 48 and 50 of the top-forming portion 42a are formed in parallel to the center axis 46 of the pole portion 24. The transition portion 42b is located between the pole portion 24 and the top-forming portion 42a. A core angle θ of the upper core portion is set at an angle of 120 degrees or larger (preferably 120 degrees less than or equal to θ less than or equal to 180 degrees but it may be slightly larger than 180 degrees). In FIG. 3A, the core angle θ is determined at 180 degrees.

The upper core portion 38 is constructed as a two-layer structure of a first layer 38-1 and a second layer 38-2 laminated together. The first layer 38-1 is a core portion having no pole portion, in other words, solely consisting of a back region whereas the second layer core 38-2 is a core portion having both the pole portion 24 and a back region 42. The upper core portion 38 is made so that the back region 42 is formed to be thicker than the pole portion 24. This structure is adopted for preventing magnetic saturation in the back region 42 and thereby producing magnetic saturation in the vicinity of a throat height zero position THZ and also for reducing reluctance in the entire upper core portion. In the prior art structure, as shown in FIG. 3C which is a sectional view taken along arrows B—B in FIG. 3A, a foremost end surface 38a nearer to the pole portion 26 of the back region 42 in the upper core portion 38 consists of a first layer end surface 38-1a and a second layer end surface 38-2a which are located substantially at the same position.

The upper and lower core portions 38 and 14 are formed by depositing soft magnetic material films in a magnetic field which is parallel to an easy axis formed so as to form the easy axis which is parallel to a recording surface of a magnetic disk. As a result, as shown in FIG. 4, parallel magnetic domains 52 and triangular magnetic domains 54 are formed in the upper core portion 38. In this case, since magnetic walls 56a and 56b have the same length, displacement of the magnetic walls 56a and 56b becomes symmetrical when magnetization changes upwardly and downwardly as shown by arrows B in FIG. 4. As a result, storage of distortion energy is reduced whereby wiggle waveform distortion and popcorn noise are reduced. If the core angle is between 180 degrees and 120 degrees, generation of wiggle waveform distortion and popcorn noise due to the existence of the triangular magnetic domains having different lengths of the magnetic walls 56a and 56b is relatively small.

FIG. 5A shows results of measurement of wiggle waveform distortion and FIG. 5B shows results of measurement of popcorn noise when the core angle θ is varied. These results of measurement show that wiggle waveform distortion and popcorn noise can be reduced to a practically insignificant degree by setting the core angle θ at an angle of 120 degrees or larger.

When, in forming a back region of an upper core portion, a step portion is formed in a portion formed on a transition portion of an insulating layer and an overcoat layer is formed on top of the back region by sputtering, there often is produced a void (hollow portion or crevice) at this step portion.

FIGS. 6A to 6F show an example of a process of forming the upper core portion 38 in FIGS. 3A to 3C (illustrated with respect to the section taken along the arrows B—B in FIG. 3A). This formation process will be described below.

(1) Coating and exposing of a positive-type photoresist (FIG. 6A)

After laminating a conduction coil 19 and an insulating layer 18, a positive-type photoresist 25 is coated by a spin coat method or the like and then a mask 23 is disposed above the photoresist 25 to expose the photoresist 25 in a portion which is to constitute the first layer 38-1 of the upper core portion.

(2) Development (forming of a photoresist frame) (FIG. 6B)

The photoresist is developed and a portion of the photoresist which has been exposed is removed to form a photoresist frame 25' having an edge surface 25a'.

(3) Forming of first layer of the upper core (FIG. 6C)

The first layer 38-1 of the upper core portion is formed by electroplating magnetic material such as permalloy or the like through the photoresist pattern 25'. After the first layer 38-1 has been formed, the photoresist 25' is removed.

(4) Coating and exposing of a positive-type photoresist (FIG. 6D)

A positive-type photoresist 33 is coated by a spin coating method or the like and then a mask 35 is disposed above the photoresist 33 to expose a portion of the photoresist 33 which is to constitute a second layer 38-2 of the upper core portion.

(5) Development (forming of a photoresist pattern) (FIG. 6E)

The photoresist 33 is developed and a portion of the photoresist 33 which has been exposed is removed to form a photoresist pattern 33' having an edge surface 33a'.

(6) Forming of a second layer of the upper core (FIG. 6F)

The upper layer 38-2 of the upper core portion is formed by electroplating magnetic material such as permalloy or the like in the portion which is bordered by the photoresist pattern 33'. After the second layer 38-2 has been formed, the photoresist pattern 33' is removed.

In the exposing processes of FIGS. 6A and 6D in the process of forming the upper core portion 38 described above, light is reflected on the inclined surface 18b of the insulating layer 18 or the inclined surface 38-1c of the first layer 38-1 of the upper core portion 38 in a direction which is different from the direction of incident light and, therefore, into a portion of the photoresist which should be left unremoved. For this reason, as shown in FIGS. 6B and 6E, end surfaces 25a' and 33a' of the photoresist patterns 25' and 33' are formed not perpendicular to but oblique to the horizontal plane. As a result, the upper core portion 38 which is formed as a replica has a foremost end surface 38a (38-1a and 38-2a) nearer to the pole portion which is obliquely formed as shown in FIG. 6F. The thickness of a step at the end surface 38a is equal to the collective thickness of the first layer 38-1 and the second layer 38-2 at the top-forming portion 42a. The degree of inclination of the end surface 38a varies depending upon the angle of inclination of the inclined surface of the insulating layer 18 and the angle of incident light for exposure.

As a result, the step at the end surface 38a overhangs with respect to a slanted surface of the insulating layer 18.

In the prior art thin film magnetic head 1 of FIGS. 1A and 1B which has a small core angle, an end surface 38a nearer to the pole portion of the transition portion 20a is formed at a portion having a relatively gradual inclination away from the foremost end portion of the pole portion 24 as shown in FIG. 7A. In this case, even when voids are produced, voids 60 of a relatively small size are produced and locations of the voids 60 are remote from the foremost end portion of the pole portion 24. Accordingly, when the substrate is ground from the foremost end side after forming of the substrate to a predetermined throat height, the voids 60 do not appear on an air-bearing surface 62 of the slider.

In the case of the thin film magnetic head having a rectangular back region in an upper core portion as shown in FIGS. 3A to 3C which has a large core angle θ, the end surface 38a nearer to the pole portion of the upper core portion 38 is formed in its entirely at a portion of a relatively sharp inclination which is near the foremost end portion of the pole portion 24 as shown in FIG. 7B. For this reason, when the overcoat layer 22 is ground from the foremost end side of the pole portion after forming of the substrate to a predetermined throat height, voids 60 appear on the glide surface 62 of the slider and adversely affect the characteristics of the magnetic head.

If is, therefore, an object of the invention to provide a thin film magnetic head of a type which has a rectangular upper core type for reducing wiggle waveform distortion and popcorn noise which is capable of preventing occurrence of a defect in an overcoat layer covering an upper core portion and thereby improving the yield in production of magnetic heads.

SUMMARY OF THE INVENTION

For achieving the above-described object of the present invention, a thin film magnetic head having a laminated structure comprises a lower core portion provided over a substrate and having a pole portion, a magnetic gap layer provided on the lower core portion, an insulating layer provided on the magnetic gap layer and having a top section, transition portion adjacent to the top section and having an inclined section located below the top section and a skirt portion located below the inclined section, conduction coils provided in the insulating layer, an upper core portion provided on the insulating layer, and an overcoat layer provided on the upper core portion, said upper core portion having a pole tip portion of a reduced width which is provided at the skirt portion of the insulating layer and is opposed to the pole portion of the lower core portion through the magnetic gap layer and whose foremost end portion is opposed to a recording surface of a magnetic medium and a back region, said back region including a top-forming portion of a larger width than the pole portion of the upper core portion formed on the top section of the insulating layer and having side walls formed in parallel to a center axis of the pole portion, and a transition portion formed on the inclined section of the insulating layer and located between the top-forming portion and the pole tip portion, wherein the improvement comprises that said transition portion of the back region of the upper core portion is made of a plurality of layers and that a core angle of an uppermost layer of the plurality of layers of the back region is set at an angle which is 120 degrees or larger and is smaller than about 180 degrees and a core angle of a lower layer or layers of the plurality of layers of the back region is set at an angle which is smaller than the core angle of the uppermost layer and is larger than about 60 degrees.

According to the present invention, since the transition portion of the back region of the upper core portion is made of a plurality of layers and a core angle of the uppermost layer is made large and a core angle of a lower layer is made smaller than the core angle of the uppermost layer, the height of a step portion formed in a foremost end portion nearer to the pole portion as a whole is reduced whereby occurrence of voids in an overcoat layer is reduced and, even when these voids are produced, the size of these voids is reduced. Therefore, when the overcoat layer is ground to a predetermined throat height, voids do not appear on the air-bearing surface and the yield in production of magnetic heads thereby is improved. It has been confirmed by experiments that despite such structure in which the core angle of a lower layer is smaller, the advantageous effect of the rectangular core, that is, reduction of wiggle waveform distortion and popcorn noise, can be maintained if the core angle of the uppermost layer is sufficiently large.

In one aspect of the present invention, a thin film magnetic head having a laminated structure comprises a lower core portion provided over a substrate and having a pole portion, a magnetic gap layer provided on the lower core portion, an insulating layer provided on the magnetic gap layer and having a top section, an inclined section located below the top section and a skirt portion located below the inclined section, conduction coils provided in the insulating layer, an upper core portion provided on the insulating layer, and an overcoat layer provided on the upper core portion, said upper core portion having a pole tip portion of a reduced width which is provided at the skirt portion of the insulating layer and is opposed to the pole tip portion of the lower core portion through the magnetic gap layer and whose foremost end portion is opposed to a recording surface of a magnetic medium and a back region, said back region including a top-forming portion of a larger width than the pole tip portion of the upper core portion formed on the top section of the insulating layer and having side walls formed in parallel to a center axis of the pole tip portion, and a transition portion formed on the inclined section of the insulating layer and located between the top-forming portion and the pole tip portion, wherein the improvement comprises that said transition portion of the back region of the upper core portion is made of a plurality of layers and that a foremost end portion nearer to the pole tip portion of a lower layer or layers of the plurality of layers of the back region is located rearwardly of a foremost end portion nearer to the pole portion of an uppermost layer of the plurality of layers.

According to the present invention, since the transition portion is made of a plurality of layers and a foremost end portion nearer to the pole tip portion of a lower layer or layers is located rearwardly of a foremost end portion nearer to the pole portion of an uppermost layer, the height of a step portion formed on the foremost end portion nearer to the pole tip portion as a whole is reduced whereby occurrence of voids in an overcoat layer is reduced and, even when these voids are produced, the size of these voids is reduced. Therefore, when the overcoat layer is ground to a predetermined throat height, voids do not appear on the air-bearing surface and the yield in production of magnetic heads thereby is improved.

Preferred embodiments of the present invention will be described below with reference to the accompanying drawings.

BRIEF DESCRIPTION OF THE DRAWINGS

In the accompanying drawings,

FIGS. 1A and 1B show a prior art thin film magnetic head in which FIG. 1A is a front view and FIG. 1B is a cross-sectional view taken along arrows A—A in FIG. 1A;

FIGS. 3A to 3C show a thin film magnetic head having a rectangular upper core in which FIG. 3A is a plan view, FIG. 3B is a cross-sectional view taken along arrows A—A in FIG. 3A and FIG. 3C is a cross-sectional view taken along arrows B—B in FIG. 3A;

FIGS. 6A to 6F are diagrams showing a process according to which an end surface nearer to a pole portion of an upper core portion is formed in an inclined configuration;

FIGS. 11A to 11D show an embodiment of the thin film magnetic head of the present invention in which FIG. 11A is a plan view, FIG. 11B is a cross-sectional view taken along arrows A—A in FIG. 11A, FIG. 11C is a cross-sectional view taken along arrows B—B in FIG. 11A and FIG. 11D is a plan view showing a state when a first layer of an upper core portion has been formed;

FIGS. 19A and 19B are diagrams showing another embodiment of the present invention in which FIG. 19A is a plan view and FIG. 19B is a cross-sectional view taken along arrows A—A in FIG. 19A;

FIG. 20 is a plan view showing another embodiment of the present invention;

FIG. 21 is a plan view showing another embodiment of the present invention;

FIGS. 25A and 25B are diagrams showing another embodiment of the present invention in which FIG. 25A is a plan view and FIG. 25B is a cross-sectional view taken along arrows A—A in FIG. 25A;

FIG. 26 is a plan view showing another embodiment of the present invention; and

FIG. 27 is a plan view showing still another embodiment of the present invention.

DESCRIPTION OF PREFERRED EMBODIMENT

Figure 1A:
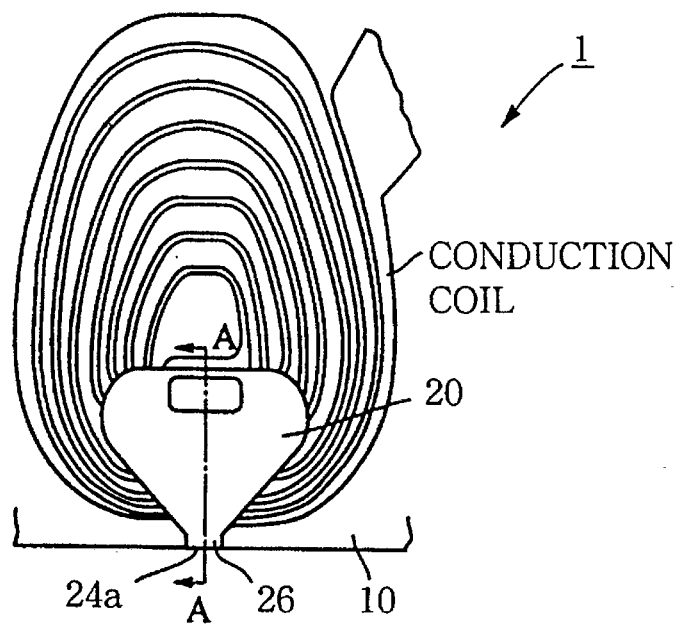
Figure 1B:
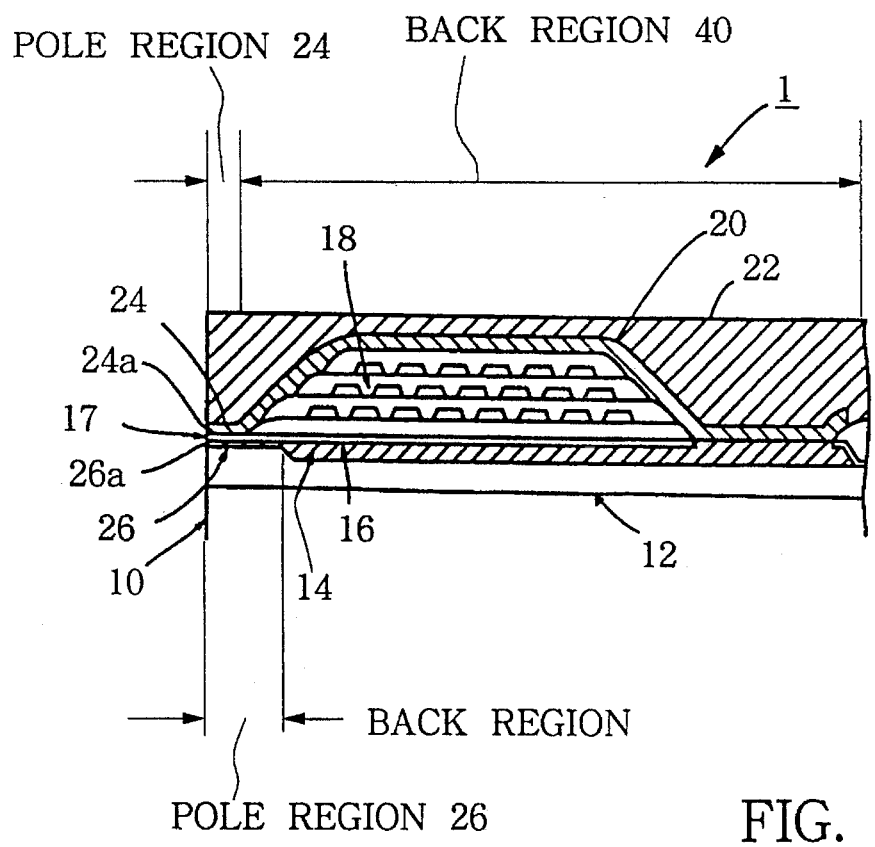
Figure 2:
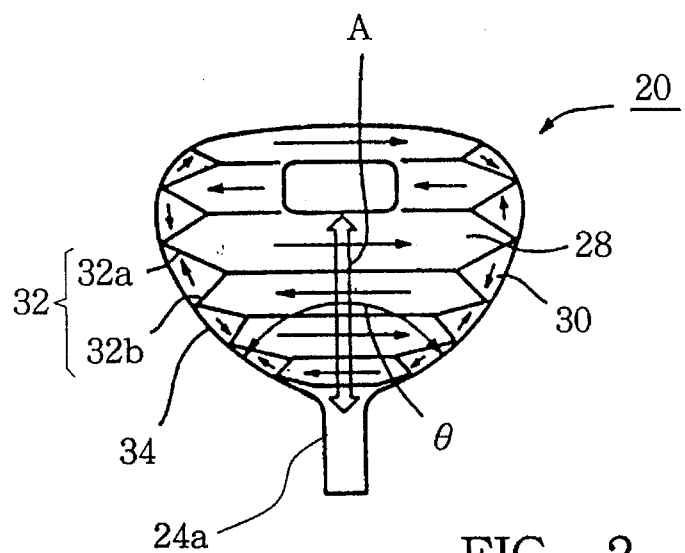
FIG. 2 is a diagram showing magnetic domains formed in the upper core section 20 in the magnetic head of FIGS. 1A and 1B.
Figure 4:
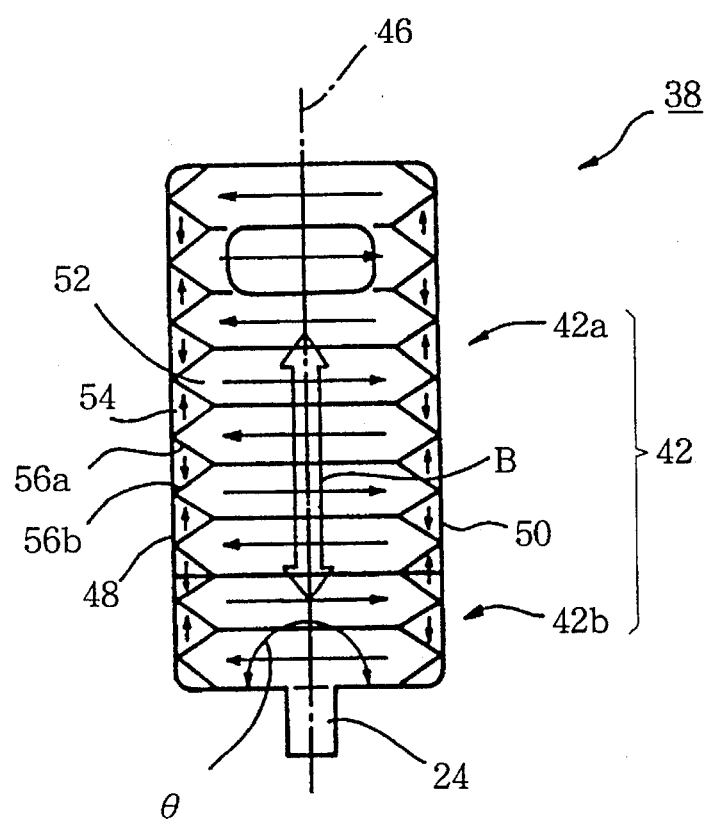
FIG. 4 is a diagram showing magnetic domains formed in the upper core portion 38 of the thin film magnetic head of FIGS. 3A to 3C.
Figure 3A:
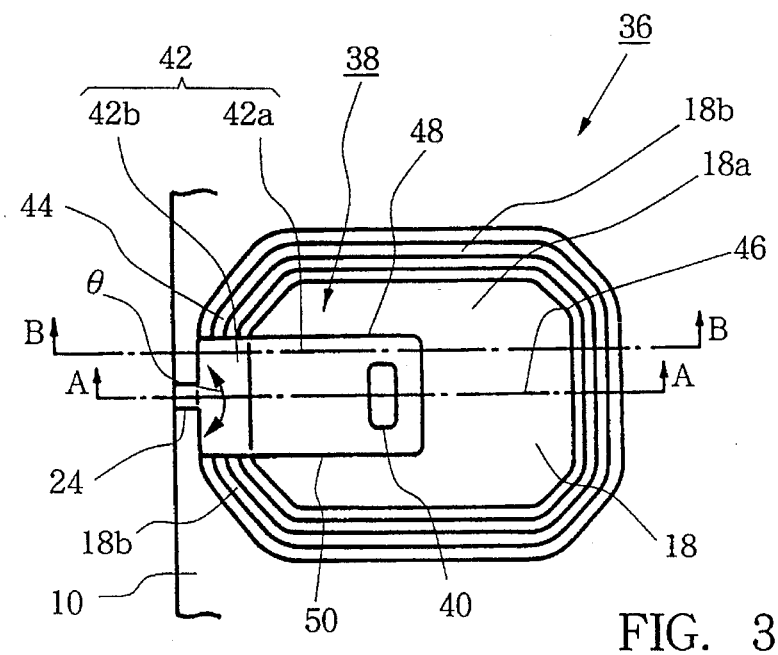
Figure 3B:
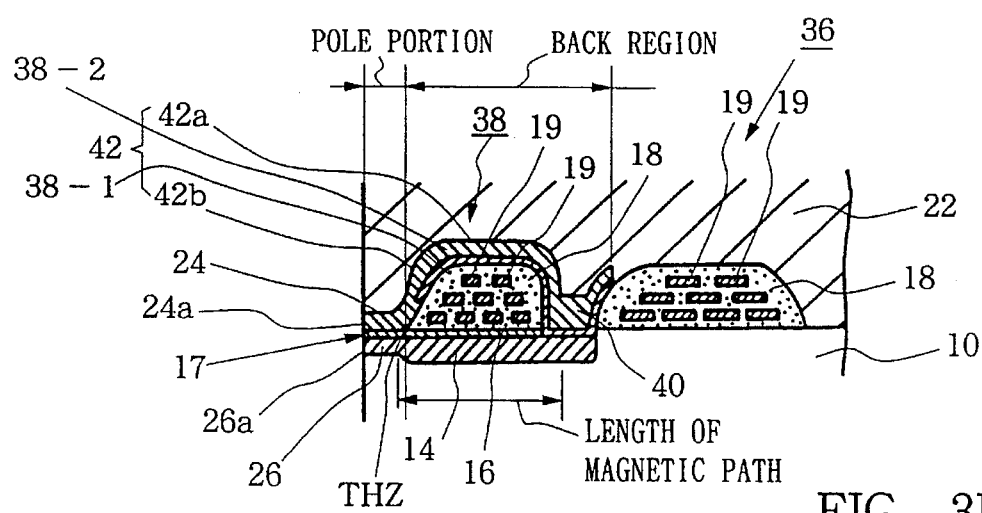
Figure 3C:
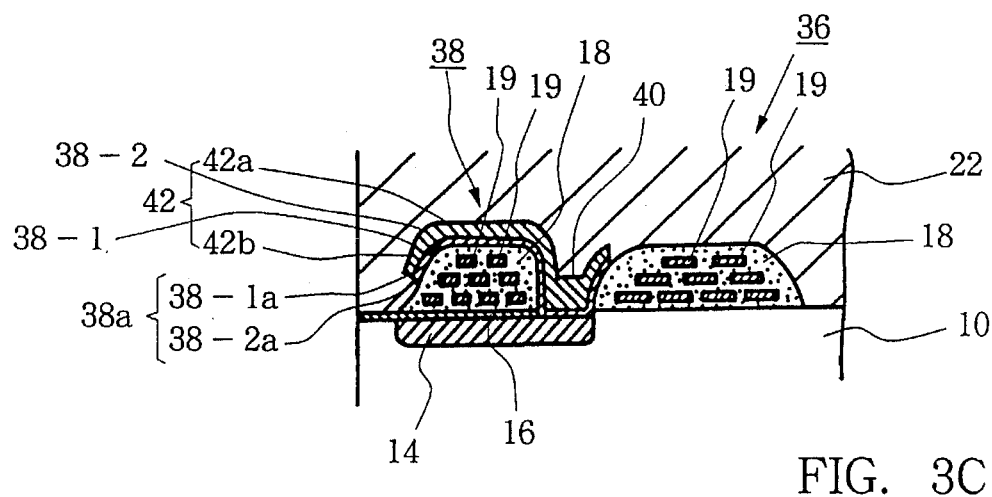

The inventors of the present invention have observed a process of forming the insulating overcoat layer 22 (FIG. 3) on samples in which the angle of inclination of the end surface 38a nearer to the pole portion of the upper core portion 38 in the upper core structure is as shown in FIGS. 3A to 3C and have considered the mechanism by which a void is developed on an air-bearing surface (glide surface of the slider, i.e., the surface opposite to the recording medium) in the overcoat layer 22.

Processes (1) to (7) shown in FIGS. 8A to 8G are a series of processes of growing the insulating overcoat layer 22 by sputtering on the upper core portion 38 in the case where the end surface 38a nearer to the pole portion of the upper core portion 38 is formed substantially perpendicularly to the horizontal plane of the surface of the substrate 10 (in these figures and subsequent FIGS. 9 to 10, illustration is made in the cross-section taken along the arrows B—B in FIG. 3A). In these figures, description of the multi-layered conduction coils is omitted.

In this case, the overcoat layer 22 is formed in substantially the same configuration as the upper core portion 38 and the insulating layer 18 which are provided thereunder and no void is produced. A crevice 70 shown in FIG. 8G (process (7)) is filled up by forming the overcoat layer 22 continuously after the process (7) and, when the overcoat layer 22 is ground to an air-bearing surface (ABS) 62 of the slider after completion of the formation of the overcoat layer 22, no void or depression appears on the ABS 62, so that the magnetic head characteristics are not impaired.

Processes (1) to (7) shown in FIGS. 9A to 9G are a series of processes of growing the insulating overcoat layer 22 by sputtering on the upper core portion 38 in the case where the end surface 38a nearer to the pole portion of the upper core portion 38 is formed substantially normally to the inclined portion 18b of the insulating layer 18.

In this case, the end surface 38a nearer to the pole portion of the upper core portion 38 more or less forms an overhang and, therefore, the crevice 70 is enlarged as the formation of the overcoat layer 22 advances (processes (3) to (5)) until at last there is produced a void 60 in the vicinity of the end surface 38a nearer to the pole portion of the upper core portion 38 (processes (6) and (7)). The void 60 is left and is unremoved. Accordingly, when the overcoat layer 22 is ground to the ABS 62 after growing the overcoat layer 22 continuously after the process (7) of FIG. 9G, the voids are exposed on the ABS 62 with the result that a magnetic head having desired glide characteristics cannot be obtained.

Processes (1) to (7) shown in FIGS. 10A to 10G are processes of growing the insulating overcoat layer 22 by sputtering on the upper core portion 38 in the case where the end surface 38a nearer to the pole portion of the upper core portion 38 forms such a large overhang that it forms a visor with respect to the insulating layer 18.

In this case, the overcoat layer 22 is not formed in a portion on the surface of the insulating layer 18 under the overhang portion of the upper core portion 38 and, therefore, a large crevice 70 is formed from the initial stage of growing of the overcoat layer 22 with the result that an upper layer 22-1 and a lower layer 22-2 grow separately from each other. The upper layer 22-1 of the overcoat layer 22 grows with an overhang, reflecting the configuration of the upper core portion 38. Therefore, as the overcoat layer 22 grows further after process (7) shown in FIG. 10G, voids 60 are left unremoved and, when the overcoat layer 22 is ground to the ABS 62 after completion of the formation of the overcoat layer 22, the voids 60 are exposed on the ABS 62 with the result that a magnetic head having desired glide characteristics cannot be obtained.

In the foregoing, referring to FIGS. 8 to 10, description has been made about differences in the formation of voids 60 due to the inclination angle of the end surface 38a nearer to the pole portion of the upper core portion 38.

An embodiment of the thin film magnetic head according to the present invention is shown in FIGS. 11A to 11D. An example of a process of manufacturing of the thin film magnetic head is shown in FIGS. 12A to 12J.

Figure 11A:
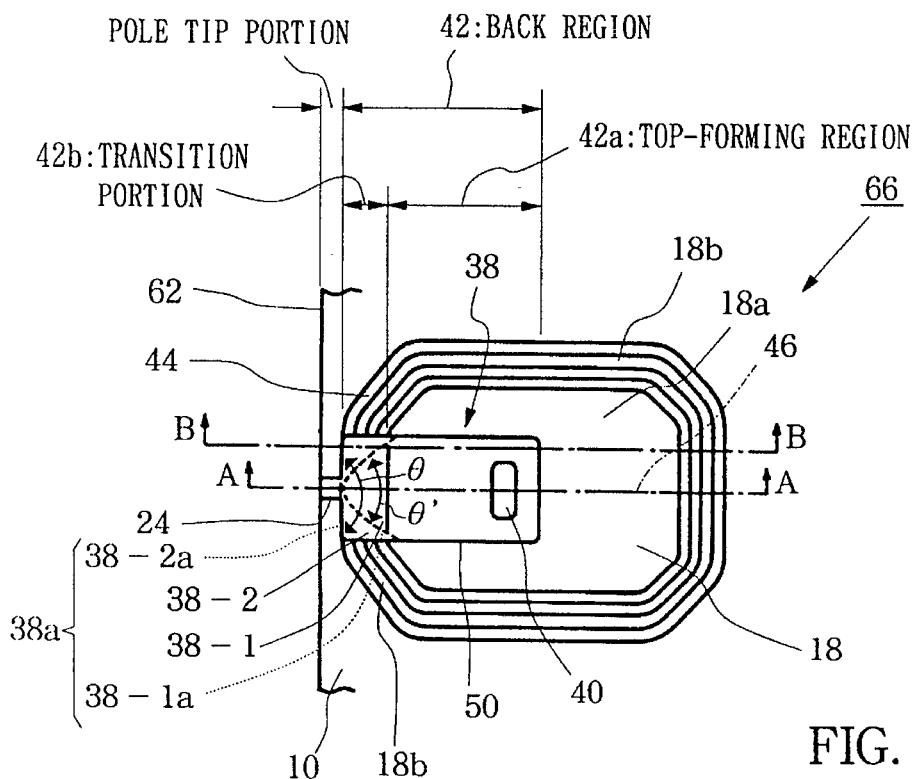
Figure 11B:
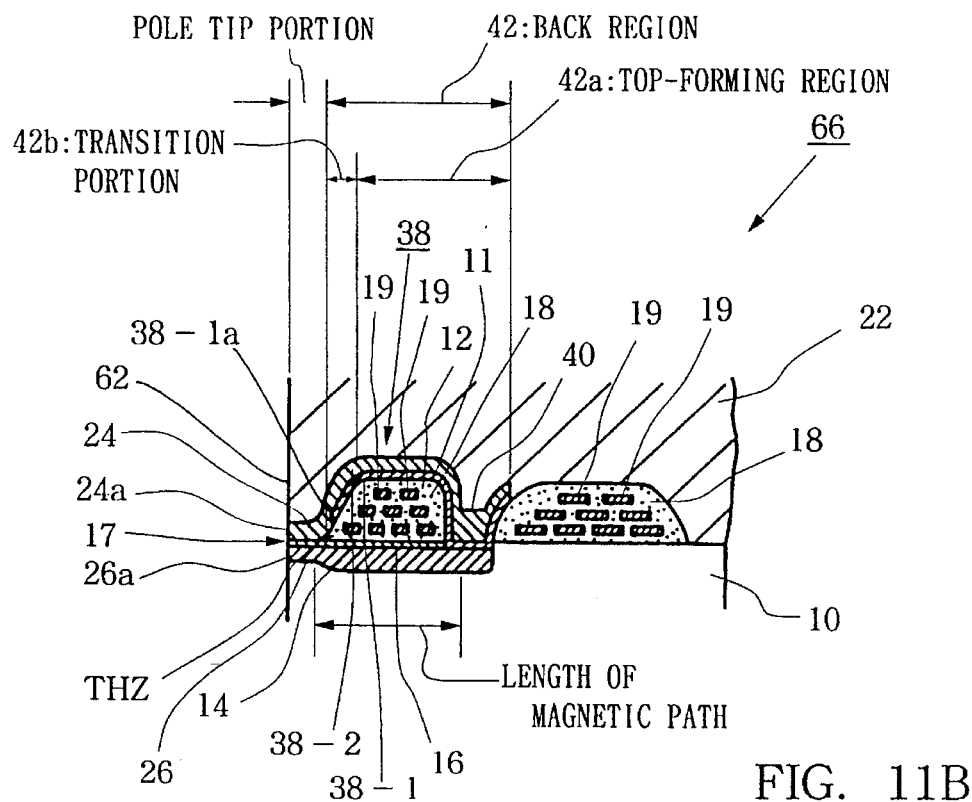
Figure 12A:
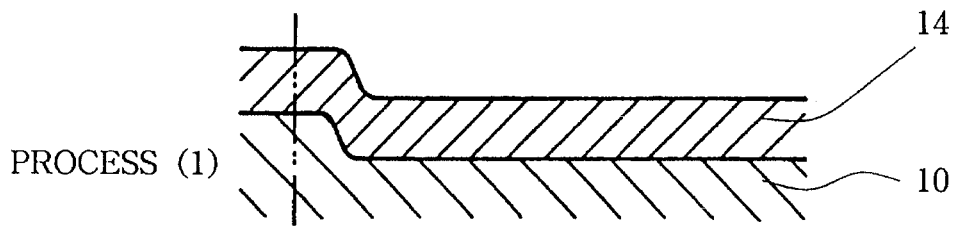
FIGS. 12A to 12J are diagrams showing a process for manufacturing the thin film magnetic head of FIGS. 11A to 11D.
Figure 12B:
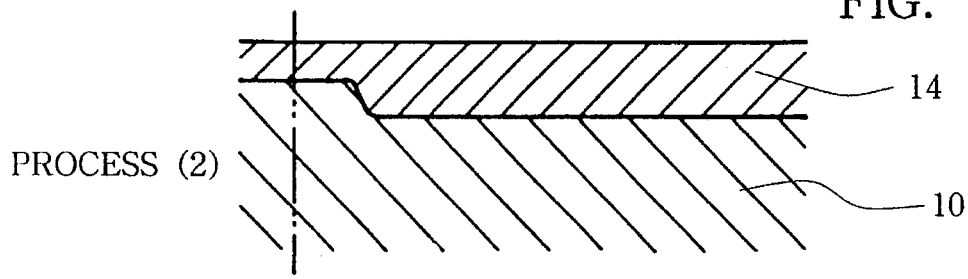
Figure 12C:
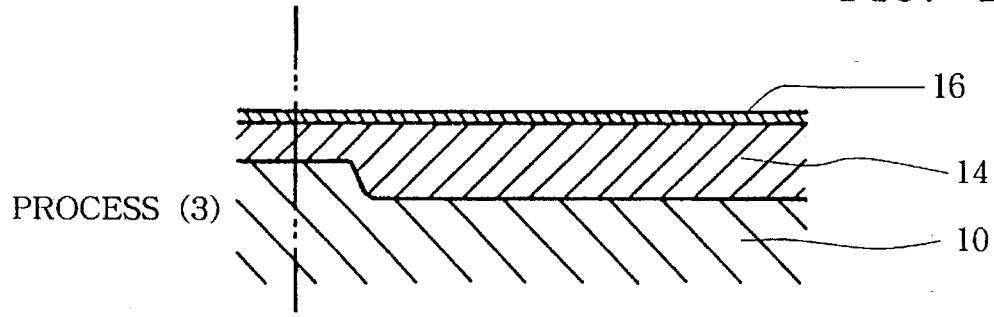

A thin film magnetic head 66 includes a clean, mirror-surface slider substrate 10 which is made of, e.g., an $Al_2O_3$—TiC system ceramic plate. On this substrate 10 is deposited, by a conventional sputtering method or the like, an undercoat layer (not shown) of $SiO_2$, $Al_2O_3$ or the like having a thickness of ten and several microns. A lower core portion 14 is deposited under a magnetic field on the undercoat layer by electroplating, for example, as shown in FIG. 12A. After formation of the lower core portion 14, the lower core portion 14 is ground to a flat surface as shown in FIG. 12B. A magnetic gap layer 16 is deposited by sputtering on the lower core portion 14 (FIG. 12C) to form a magnetic gap 17 (FIG. 11B). Like the undercoat layer, the magnetic gap layer 16 is made of non-magnetic material, for example, $SiO_2$, $Al_2O_3$ or the like.

Figure 12D:
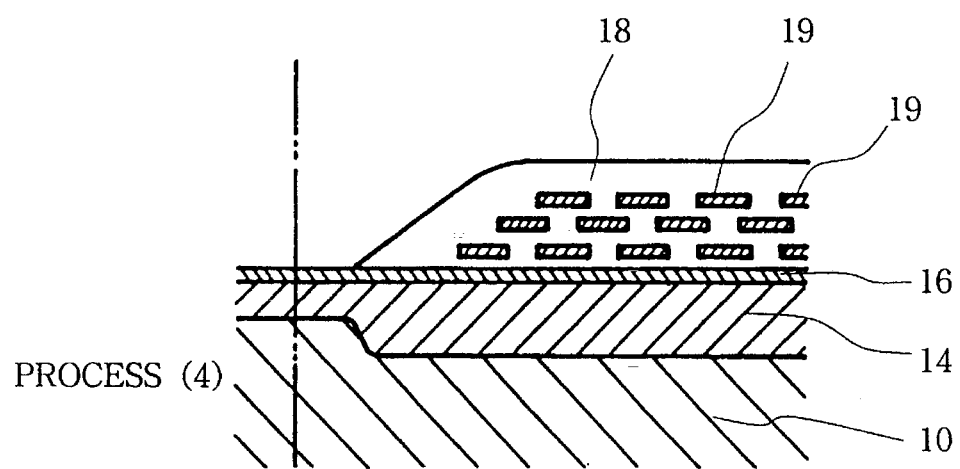
Figure 12E:
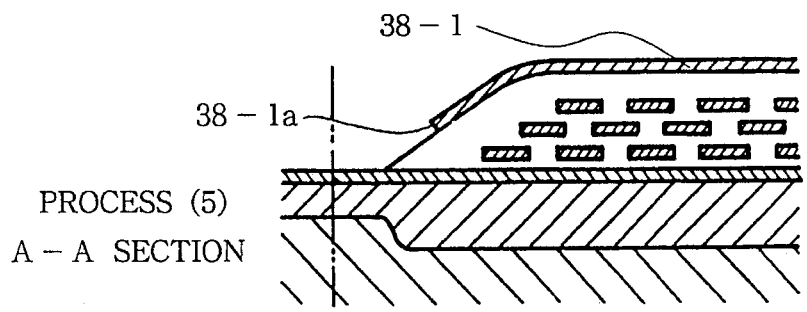
Figure 12F:
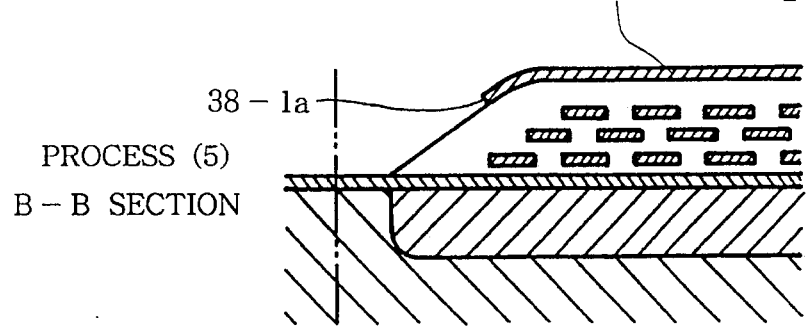
Figure 12G:
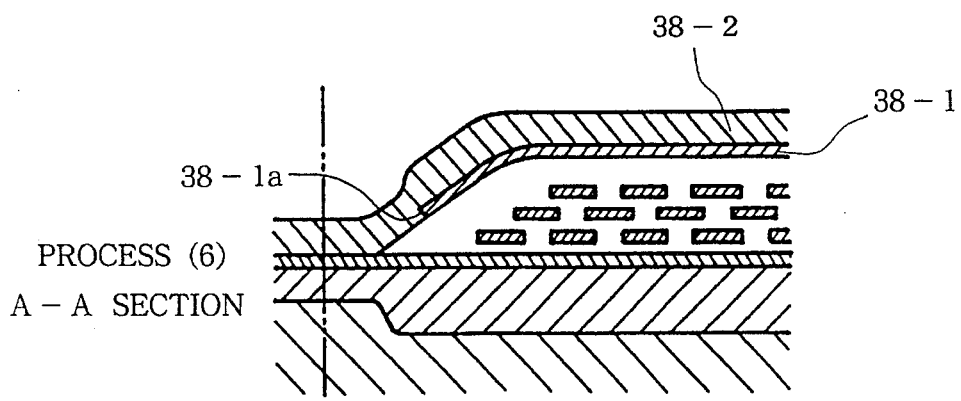
Figure 12H:
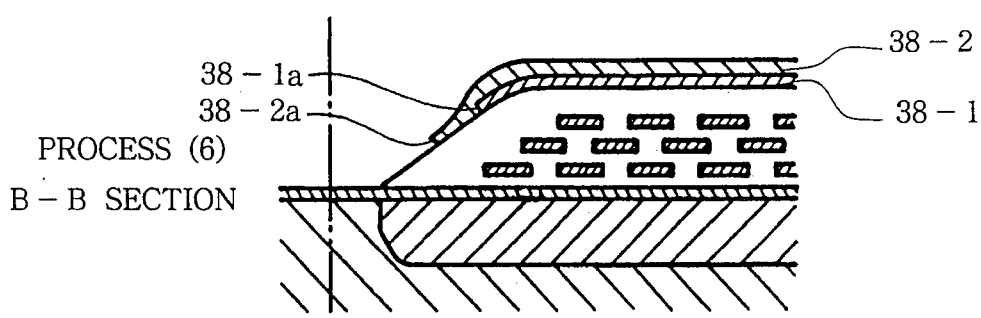
Figure 12I:
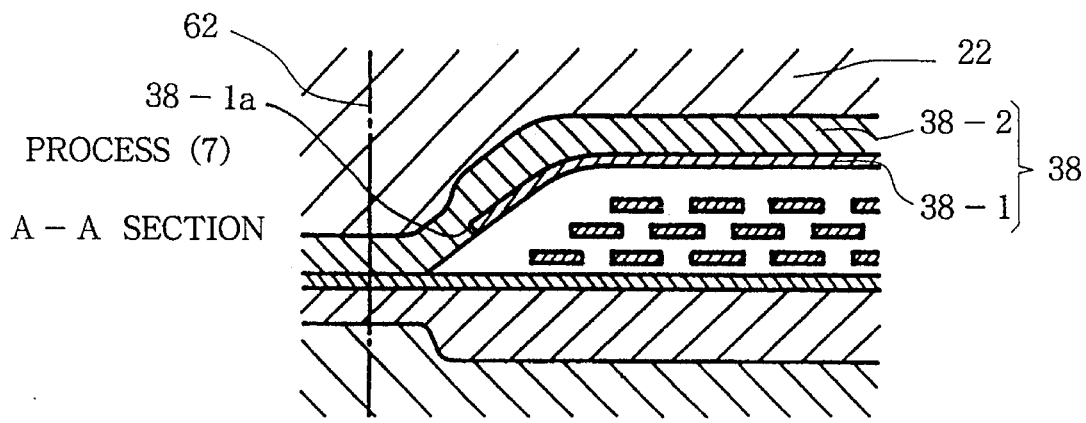
Figure 12J:
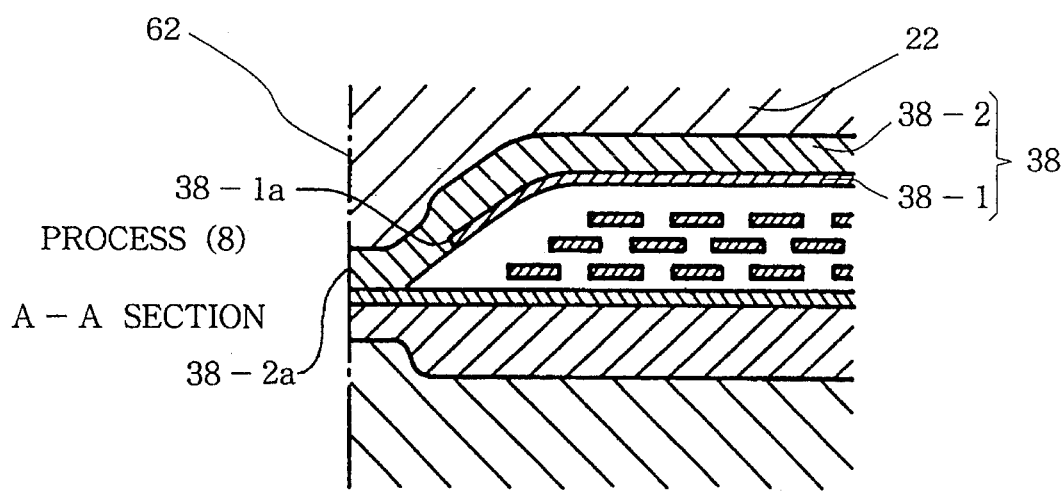

On the magnetic gap layer 16 are provided conduction coils 19 and an insulating layer 18 (FIG. 12D). A positive-type photoresist is normally used as the insulating layer 18 which is hardened to a stable state by heating. Conduction coils 19 of respective layers are made of conductive material such as Cu or the like and formed to a thickness of several microns by electroplating. On the insulating layer 18 is provided, under a magnetic field, a first sublayer 38-1 of an upper core portion 38 by electroplating (FIGS. 12E and 12F). On the first sublayer 38-1 is provided, in a magnetic field, a second sublayer 38-2 of the upper core portion 38 by electroplating (FIGS. 12G and 12H). On the upper core portion 38 is provided, by sputtering, a protective insulating overcoat layer 22 which is made of insulating material such as $SiO_2$, $Al_2O_3$ or the like and covers the entire upper core portion 38 (FIG. 12I). An air-bearing surface (ABS) 62 of the slider is ground to a predetermined throat height (FIG. 12J). As a result, an edge surface, to be opposed to a recording medium, of the protective insulating overcoat layer 22, the upper core portion 38, the magnetic gap layer 16, the lower core portion 14 and the slider substrate 10 become coplanar to each other. The collective edge surfaces are flat and depression-free for reasons described hereinafter.

A pole tip portion 26 of the lower core portion 14 is opposed to a pole tip portion 24 of the upper core portion 38 through the magnetic gap layer 16 (FIG. 11B) and foremost end portions 24*a* and 26*a* of the pole tip portions 24 and 26 are opposed to a recording surface of a magnetic disk (not shown). The upper core portion 38 and the lower core portion 14 are connected to each other at a rear gap through hole 40 (FIG. 11A). The upper core portion 38 and lower core portion 14 are magnetically connected through the rear gap through the hole 40 to thereby form a yoke structure.

The upper core portion 38 has the pole tip portion 24 formed at a skirt portion 44 of the insulating layer 18 and a back region 42 which starts from a back end of the pole tip portion 24 and is formed symmetrically with respect to a center axis 46 along a longitudinal direction of the pole tip portion 24. The longitudinal direction is perpendicular to a plane of a recording medium. From a top view, the back region 42 has a rectangular shape. The back region 42 has a top-forming portion 42*a* formed on the top of the insulating layer 18 and a transition portion 42*b* having a slanted surface with respect to the horizontal surface of the substrate 10. The top-forming portion 42*a* has a substantially flat surface and the plane thereof is parallel to the substrate 10. Outer side walls 48 and 50 of the top-forming portion 42*a* are formed in parallel to the center axis 46 of the pole tip portion 24. The transition portion 42*b* is located between the pole tip portion 24 and the top-forming portion 42*a* with a core angle θ being determined at an angle of 120 degrees or larger (preferably 120 degrees less than or equal to θ less than or equal to 180 degrees but it may be slightly larger than 180 degrees). In FIG. 11A, the core angle θ is set to be at 180 degrees.

The upper and lower core portions 38 and 14 are formed by depositing soft magnetic films under a magnetic field which is parallel to an easy axis formed so as to form an easy axis which is parallel to a recording surface of a magnetic disk.

As described previously, the upper core portion 38 is made of a first sublayer 38-1 (lower sublayer) and a second sublayer (upper sublayer) 38-2 laminated on the first sublayer 38-1. In the present embodiment, the lateral width of the first sublayer 38-1 and the second sublayer 38-2 are equal. The lateral width is defined as a width parallel to a plane of a recording medium. The first sublayer 38-1 has no pole tip portion and has only a back region, and a core angle θ' of the transition portion 42*b* is made smaller than a core angle θ of the second sublayer 38-2 and is set to about 60 degrees to 120 degrees (an optimum core angle θ' being about 90 degrees). The second sublayer 38-2 has the pole tip portion 24 and the core angle θ of the transition portion 42*b* is set to 120 degrees or a larger angle (preferably 120 degrees less than or equal to θ less than or equal to 180 degrees but it may be slightly larger than 180 degrees) as described previously. In this embodiment, an end surface 38-1*a* nearer to the pole tip portion of the first sublayer 38-1 is receded so as not to coincide with an end surface 38-2*a* nearer to the pole tip portion of the second sublayer 38-2 in the transition portion 42*b*.

More specifically, the end surface 38-1*a* nearer to the pole tip portion of the first sublayer 38-1 of the upper core portion 38 is formed rearwardly of the end surface 38-2*a* nearer to the pole tip portion of the second sublayer 38-2 whereby the end surface 38-1*a* is covered by the second sublayer 38-2 of the upper core portion 38. The collective thickness of the first sublayer 38-1 and the second sublayer 38-2 at the top-forming portion 42*a* is formed to be thicker than a thickness of the pole tip portion 24. This structure is adopted for preventing magnetic saturation in the back region 42 and thereby producing magnetic saturation in the vicinity of a throat height zero position THZ and also for reducing reluctance in the entire upper core portion.

In this embodiment, the end surface 38-1*a* nearer to the pole tip portion of the first sublayer 38-1 of the upper core portion 38 is formed in an arcuate surface and its core angle θ' (an angle defined by two tangent lines at both ends of the arc) is set at about 120 degrees. In the cross-section taken along the arrows A—A in FIG. 11A, the end surface 38-1*a* of the first sublayer 38-1 is located in the vicinity of the middle point of the entire height of the transition portion 18*b* of the insulating layer 18 (FIGS. 11B, 12E, 12G, 12I and 12J).

Figure 11C:
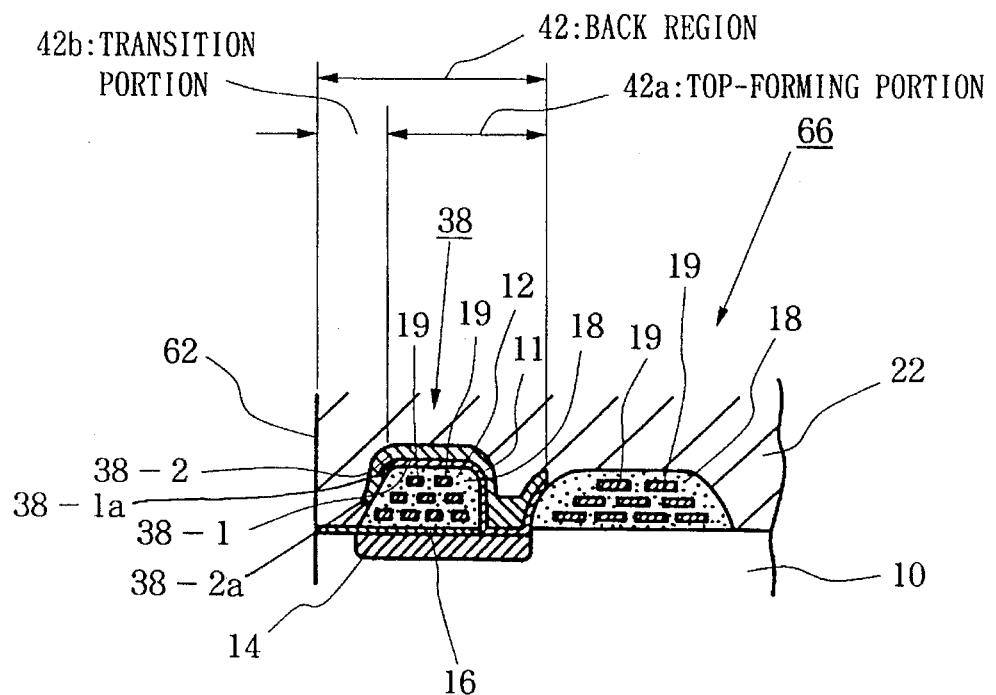
Figure 11D:
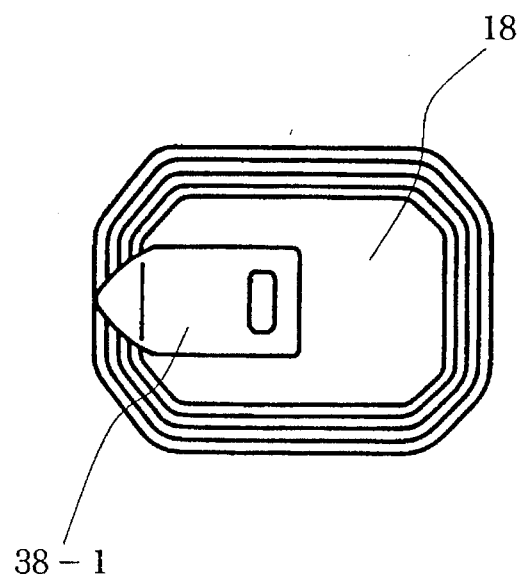

As the end surface 38-1*a* of the first sublayer 38-1 is spaced away from the arrows A—A, the rearward distance of the end surface 38-1*a* from the end surface 38-2*a* of the second sublayer 38-2 increases and approaches the top of the transition portion 18*b* and, in the cross-section taken along the arrows B—B in FIG. 11A, the end surface 38-1*a* is located at a height of ¾ or ⅘ of the entire height of the transition portion 18*b* of the insulating layer 18 (FIGS. 11C, 12F and 12H).

On the other hand, the end surface 38-2*a* nearer to the pole tip portion of the second sublayer 38-2 of the upper core portion 38 is located forwardly of the end surface 38-1*a* of the first sublayer 38-1 at a substantially constant height in the vicinity of the middle point of the transition portion 18*b* of the insulating layer 18 (FIGS. 11A and 12A). Therefore, the entire height of the end surface 38*a* nearer to the pole tip portion of the upper core portion 38 is equal to the thickness of only the second sublayer 38-2 and, for this reason, the height of a step portion is reduced as compared to the prior art thin film magnetic head having the collective thickness of the first sublayer 38-1 and the second sublayer 38-2. In forming the second sublayer 38-2 of the upper core portion 38, there is produced a step portion in the end surface 38-1*a* of the first layer 38-1. However, by forming the second layer 38-2 by electroplating, the second layer 38-2 grows isotropically so that the effect of the step portion is mitigated and a smooth surface is gradually formed with the growth of the surface of the second sublayer 38-2 of the upper core portion 38. Therefore, step coverage above the end surface 38-1*a* of the first sublayer 38-1 is improved.

Figure 13A:
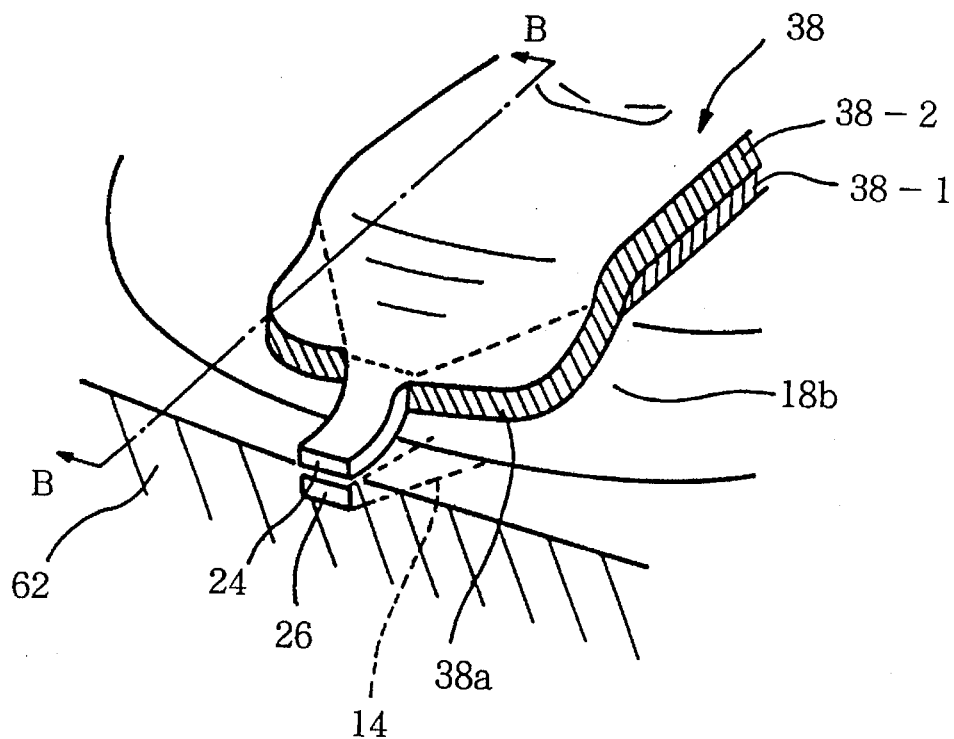
FIG. 13A is a perspective view of the upper core portion of the thin film magnetic head shown in FIGS. 11A to 11D.
Figure 13B:
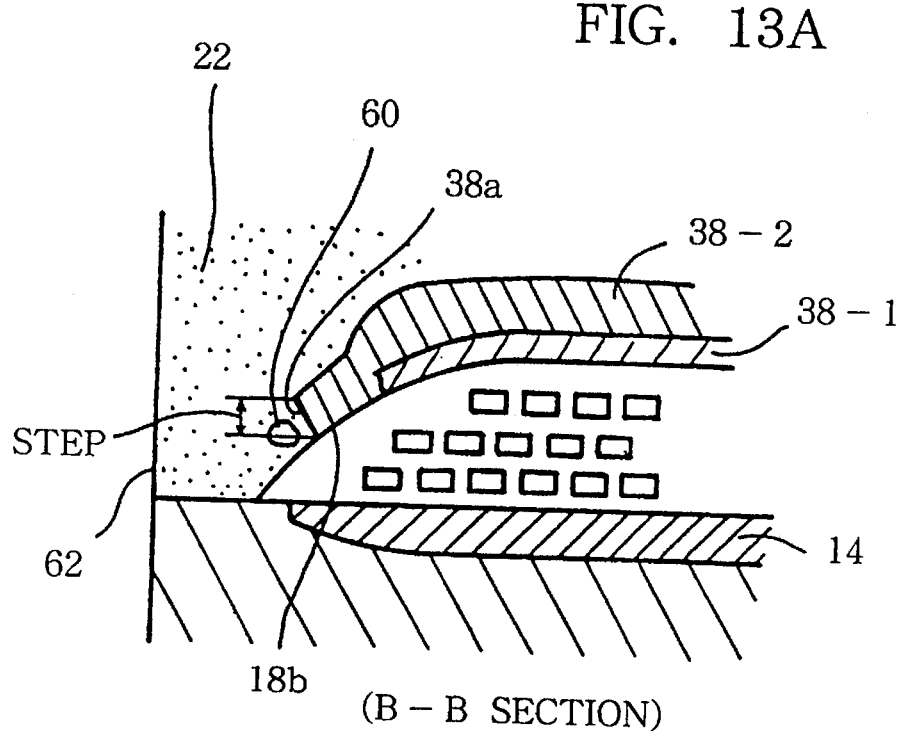
FIG. 13B is a cross-sectional view of the upper core portion shown in FIG. 13A.

By constructing the upper core portion 38 in the above-described manner, the upper core portion 38 has a relatively small step portion in the end surface 38*a* on the transition section 18*b* of the insulating section 18 as shown in FIGS. 13A and 13B. Accordingly, when the overcoat layer 22 is deposited by sputtering, voids 60 seldom occur and, even when the voids 60 do occur, the size of such voids 60 is reduced and the voids 60 do not appear on an air-bearing surface (ABS) 62 of the slider when the overcoat layer 22 is ground to a predetermined throat height.

Figure 14A:
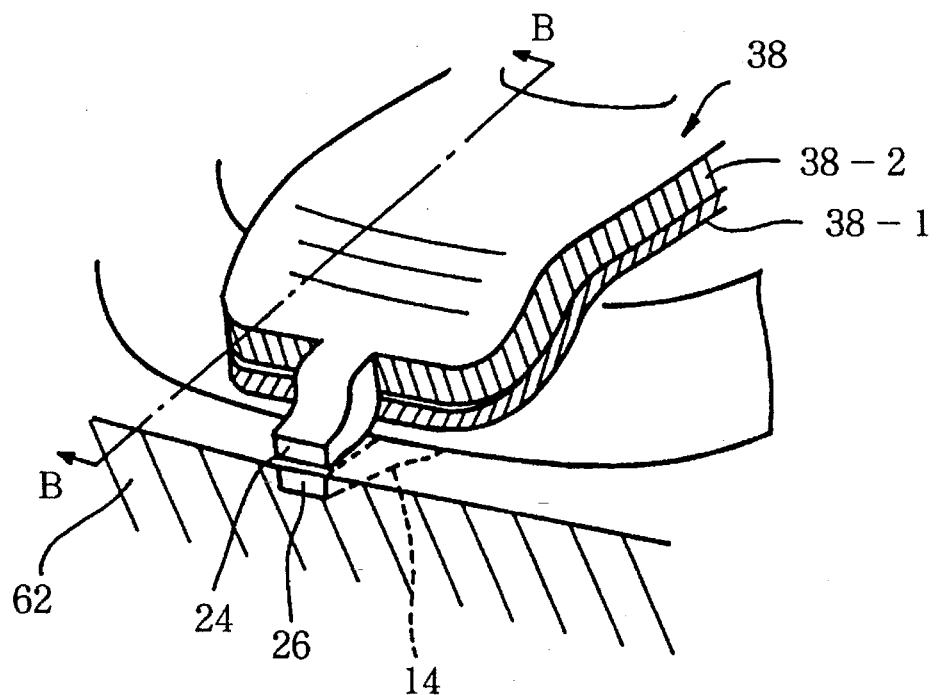
FIG. 14A is a perspective view of a thin film magnetic head having an upper core portion consisting of an upper layer and a lower layer having the same core angle.
Figure 14B:
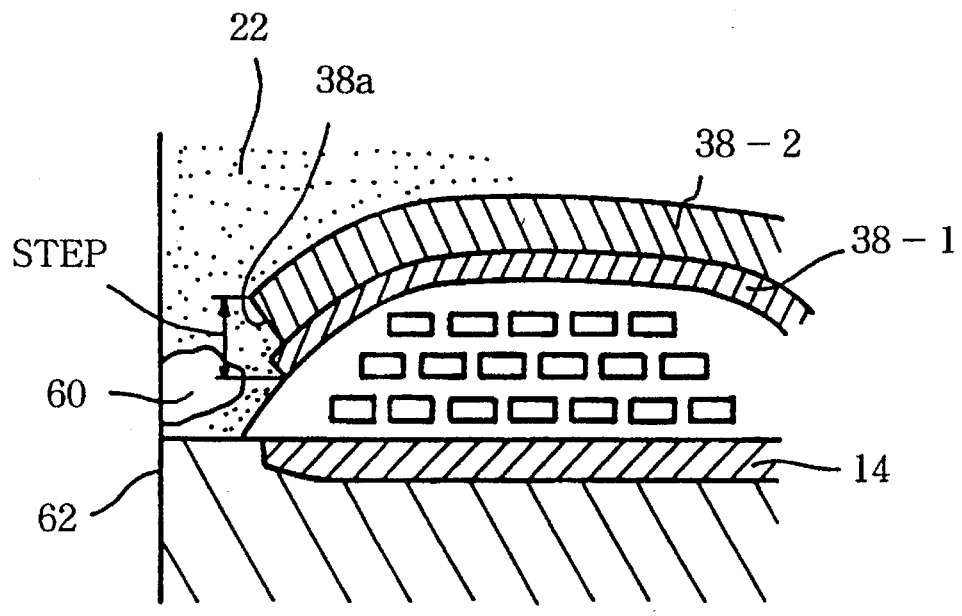
FIG. 14B is a cross-sectional view of the thin film magnetic head of FIG. 14A.
Figure 15A:
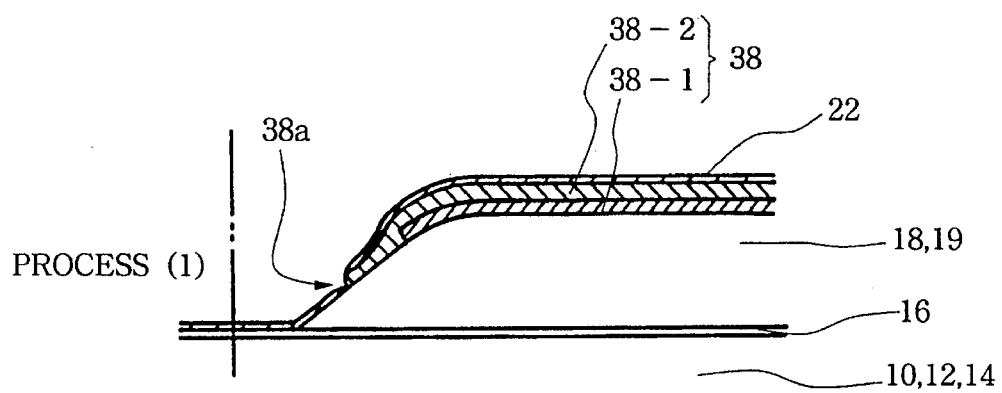
FIGS. 15A to 15H are diagrams showing a process according to which an overcoat layer 22 is formed on an upper core portion 38 in the thin film magnetic head shown in FIGS. 11A to 11D.
Figure 15B:
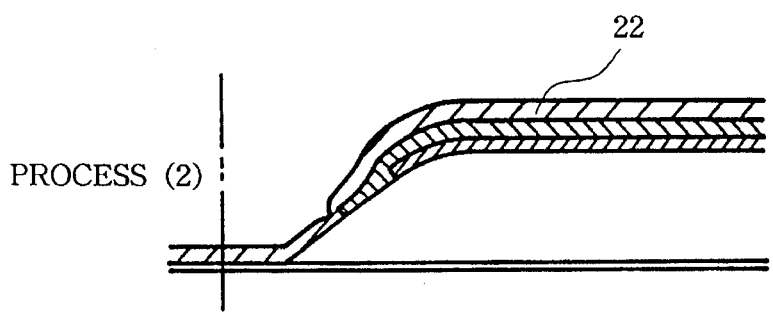
Figure 15C:
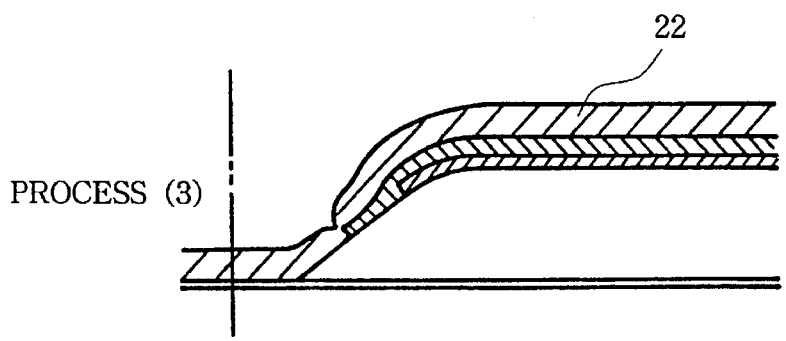
Figure 15D:
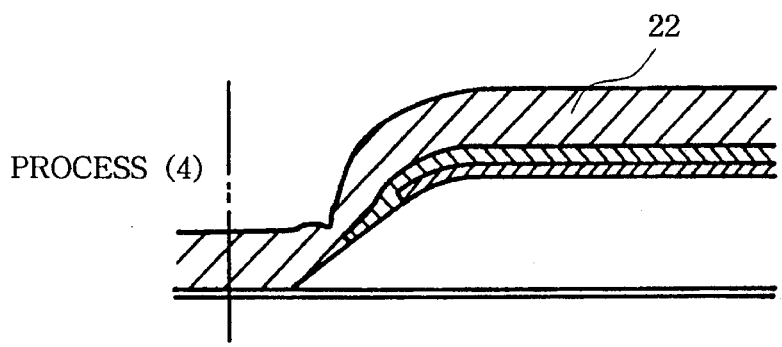
Figure 15E:
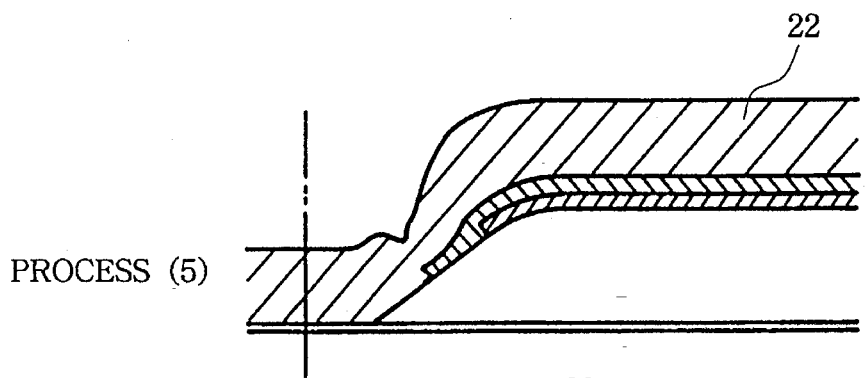
Figure 15F:
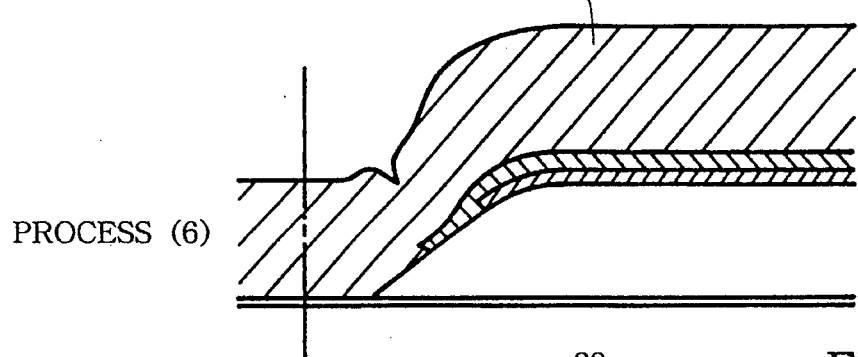
Figure 15G:
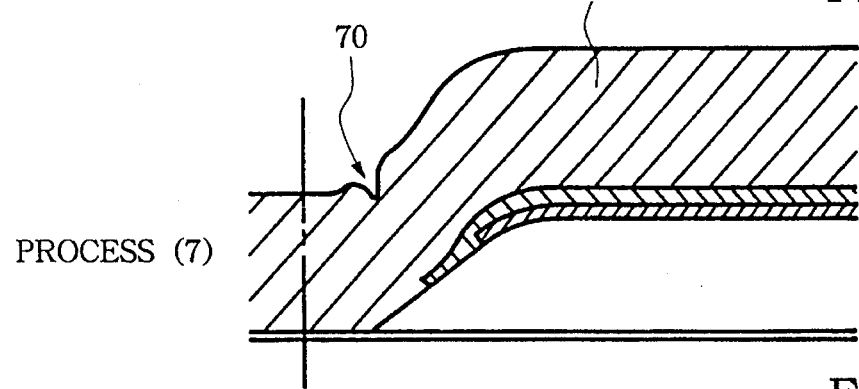
Figure 15H:
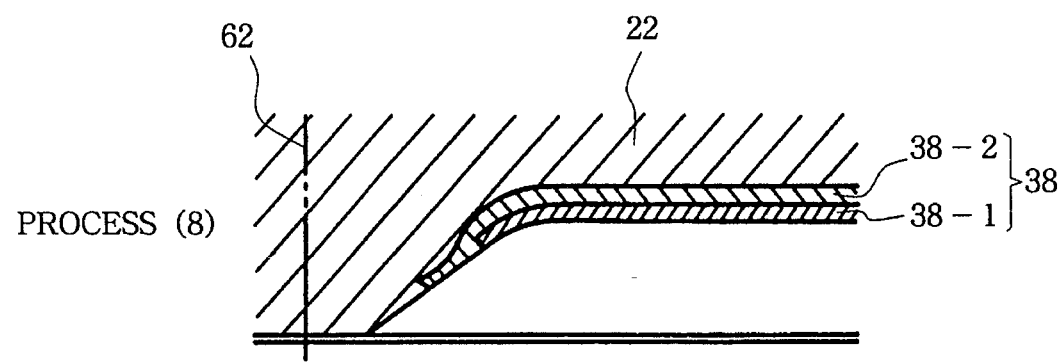

If, as shown in FIG. 14A, both the first sublayer 38-1 and the second sublayer 38-2 have the same large core angle, a step portion in the end surface 38*a* on the transition section of the insulating layer 18 will become large as shown in FIG. 14B. In this case, when the overcoat layer 22 is deposited by sputtering, a large void 60 will be produced which will appear on the ABS of the slider when the overcoat layer 22 is ground to the predetermined height with the result that the produced magnetic head will be treated as an inferior product.

The process of growth of the insulating overcoat layer 22 by sputtering on the upper core portion 38 with a reduced step portion in the end surface 38*a* nearer to the pole tip portion is shown in FIGS. 15A to 15H (shown in the cross-section taken along the arrows B—B in FIG. 11A). The overcoat layer 22 is formed substantially conformally to the upper core portion 38 and the insulating layer 18 formed thereunder. Since the step portion of the end surface 38a of the upper core portion 38 is smaller than the collective thickness of the first sublayer 38-1 and the second sublayer 38-2 at the top-forming portion 42a (the collective thickness at the transition portion 42b is equal to the step portion of the end surface 38a of the upper core portion 38), the overhang is also reduced. Because a small step portion is produced in the end surface 38a, only a small crevice 70 is produced and occurrence of a void is prevented (process (7) in FIG. 15G). Accordingly, by forming the overcoat layer 22 continuously after the process (7) shown in FIG. 15G, the crevice 70 is filled up as shown in process (8) of FIG. 15H and, when the overcoat layer 22 is ground to the ABS 62 after completion of the formation of the overcoat layer 22, no void or depression appears on the ABS 62 so that the magnetic head characteristics are not impaired. This ensures an improved yield of production.

Referring to FIG. 11B, thicknesses t1 and t2 of the first sublayer 38-1 and the second sublayer 38-2, respectively, of the upper core portion 38 can be determined in the following manner. Since the thickness t2 of the second sublayer 38-2 is determined by the thickness of the pole tip portion 24, the same thickness as the pole portion 24 is normally selected as the thickness t2. Since the thickness of the pole tip portion 24 is normally determined at a value between 2.5 microns to 3.5 microns for the purpose of concentrating flux, the thickness t2 of the second sublayer 38-2 is set at a value between 2.5 microns and 3.5 microns. On the other hand, an increase in the film thickness of the core 38 in its entirety causes an increase in reluctance due to eddy current loss as the frequency increases whereas a decrease in the film thickness causes an increase in reluctance also due to a decrease in the area of the film cross-section. For these reasons, a collective thickness t (=t1+t2) of the thickness t1 of the first sublayer 38-1 and the thickness t2 of the second sublayer 38-2 is determined to be a value at which the sum of reluctance due to eddy current loss and reluctance due to the area of the film cross-section will become relatively small (i.e., by optimizing the magnetic efficiency) and a step portion will become as small as possible. According to this standard, an optimum value of the collective thickness t of the first sublayer 38-1 and the second sublayer 38-2 is found to be 4.5 microns to 6 microns. Therefore, the thickness t1 of the first sublayer 38-1 can be set to a value obtained by subtracting the thickness t2 of the second sublayer 38-2 from this collective thickness t.

Figure 16:
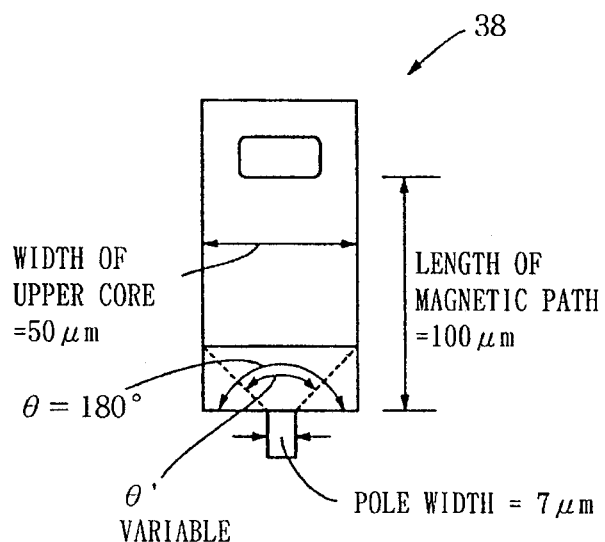
FIG. 16 is a plan view of an upper core portion used in an experiment.
Figure 17A:
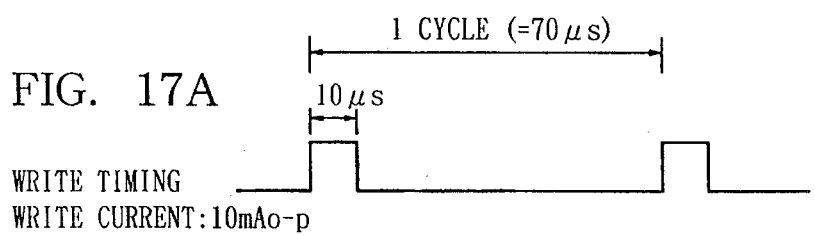
FIGS. 17A to 17C are waveform diagrams showing a manner of measuring popcorn noise produced by using the thin film magnetic head of FIGS. 11A to 11D.
Figure 17B:
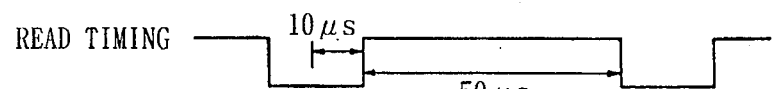
Figure 17C:
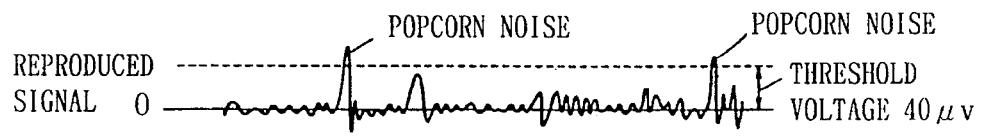
Figure 18A:
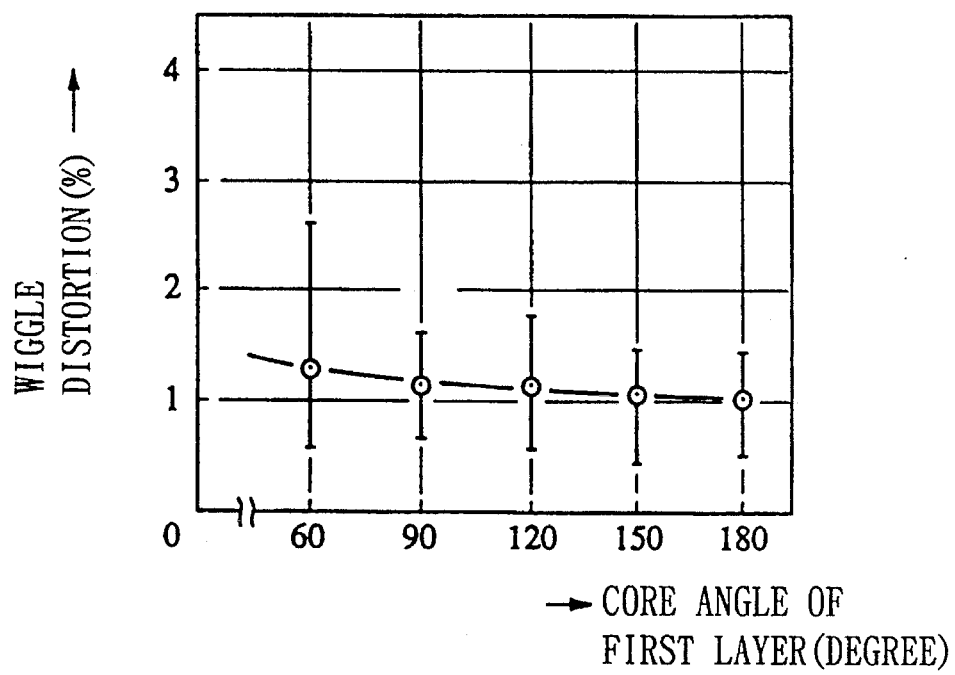
FIG. 18A is a graph showing change in wiggle waveform distortion when the core angle of the second layer of the upper core portion in the thin film magnetic head of FIGS. 11A to 11D is fixed to 180 degrees and the core angle of the first layer is varied.
Figure 18B:
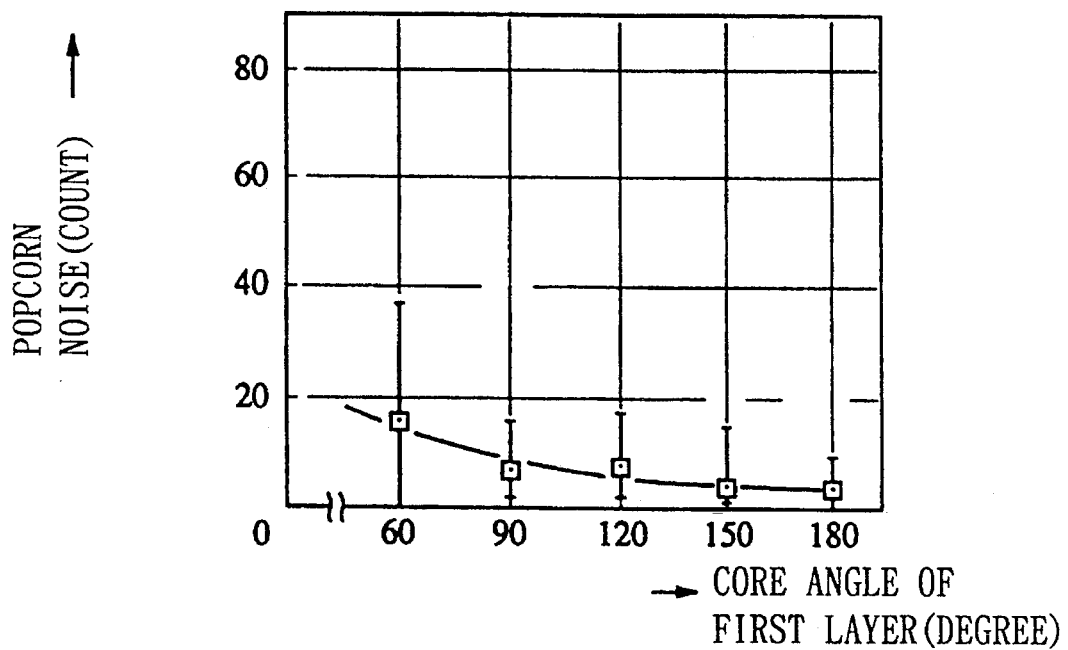
FIG. 18B is a graph showing change in popcorn noise when the core angle of the second layer of the upper core portion in the thin film magnetic head of FIGS. 11A to 11D is fixed to 180 degrees and the core angle of the first layer is varied.

Description will now be made about results of measuring wiggle waveform distortion and popcorn noise obtained in an experiment in which the core angle θ of the second sublayer 38-2 of the upper core portion 38 is fixed to 180 degrees and the core angle θ' of the first sublayer 38-1 is variously set. In this experiment, as shown in FIG. 16, the length of magnetic path of the upper core portion 38 of the thin film magnetic head was set at 100 microns, the width of the upper core portion at 50 microns and the width of the pole at 7 microns and the winding number of the conduction coil was 50 windings in four layers, and the core angles θ' of the first sublayer 38-1 were 60 degrees, 90 degrees, 120 degrees, 150 degrees and 180 degrees. The measurement of popcorn noise was made by, as shown in FIGS. 17A to 17C, repeating writing and reading with one cycle being set at 70 microseconds, counting the number of times a reproduced signal exceeded the threshold level in 10,000 cycles and using this count as the number for the popcorn noise. FIG. 18A shows the result of measuring wiggle waveform distortion and FIG. 18B shows the result of measuring popcorn noise. These results show that wiggle waveform distortion and popcorn noise can be held at an insignificant degree if the core angle of the second sublayer 38-2 is large enough even if the core angle of the first sublayer 38-1 is relatively small.

Figure 5A:
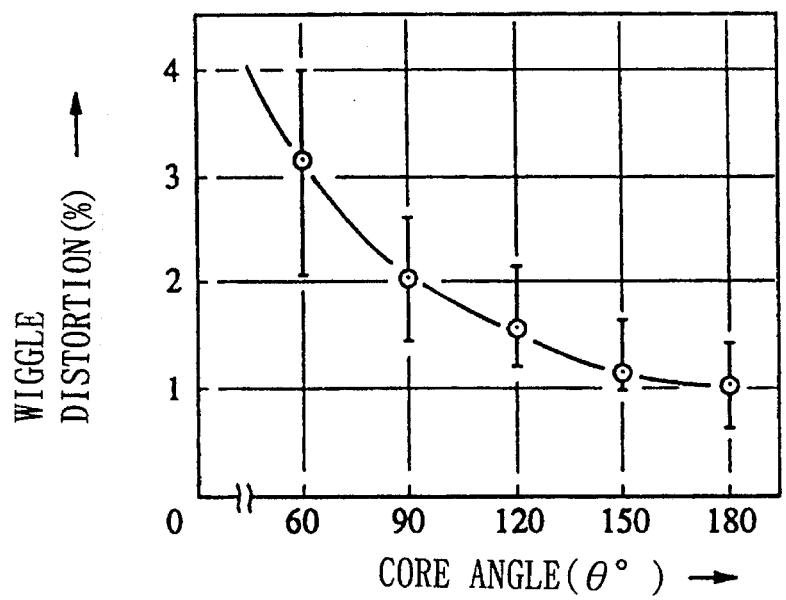
FIG. 5A is a graph showing change in wiggle waveform distortion produced when the core angle θ of the thin film magnetic head shown in FIGS. 3A to 3C is varied.
Figure 5B:
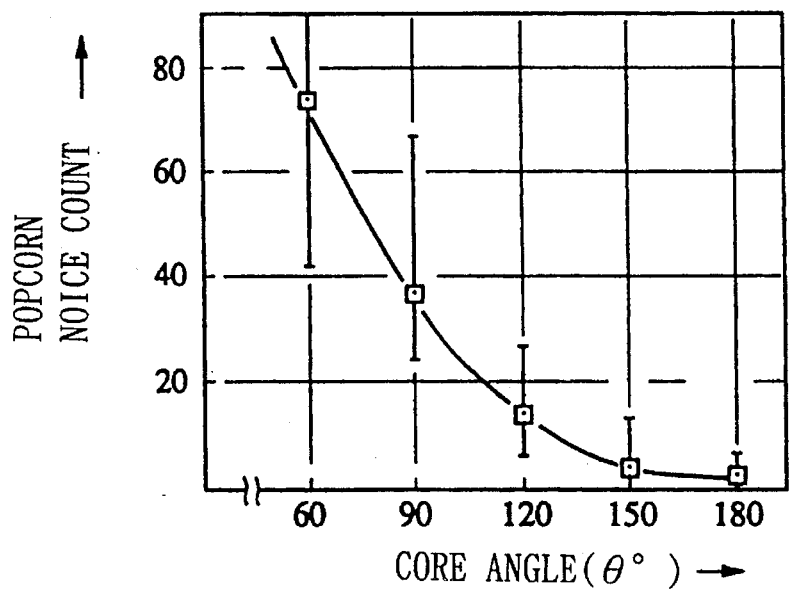
FIG. 5B is a graph showing change in popcorn noise when the core angle θ of the thin film magnetic head shown in FIGS. 3A to 3C is varied.
Figure 7A:
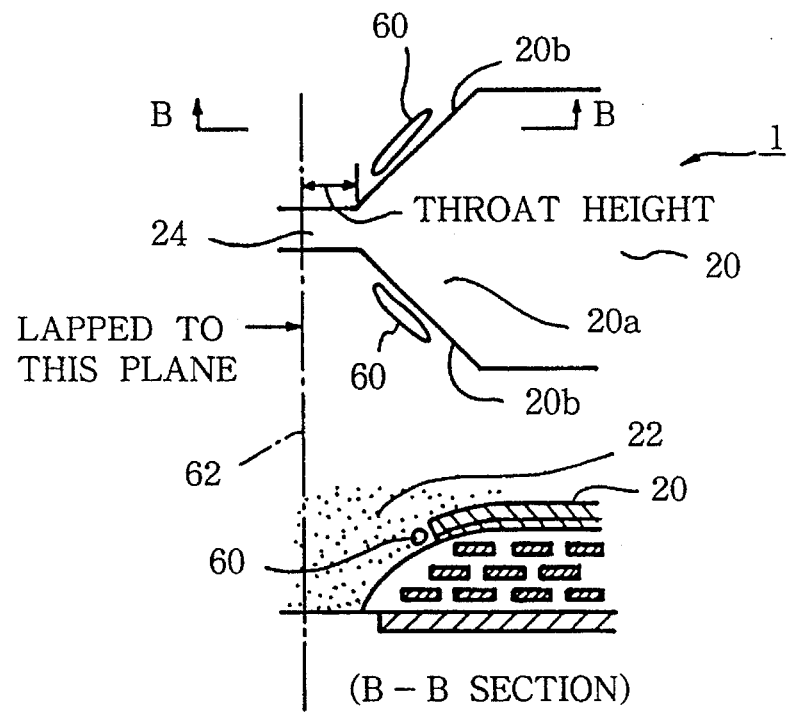
FIG. 7A is a diagram showing schematically generation of voids in a step portion of the upper core portion of the thin film magnetic head of FIGS. 1A and 1B.
Figure 7B:
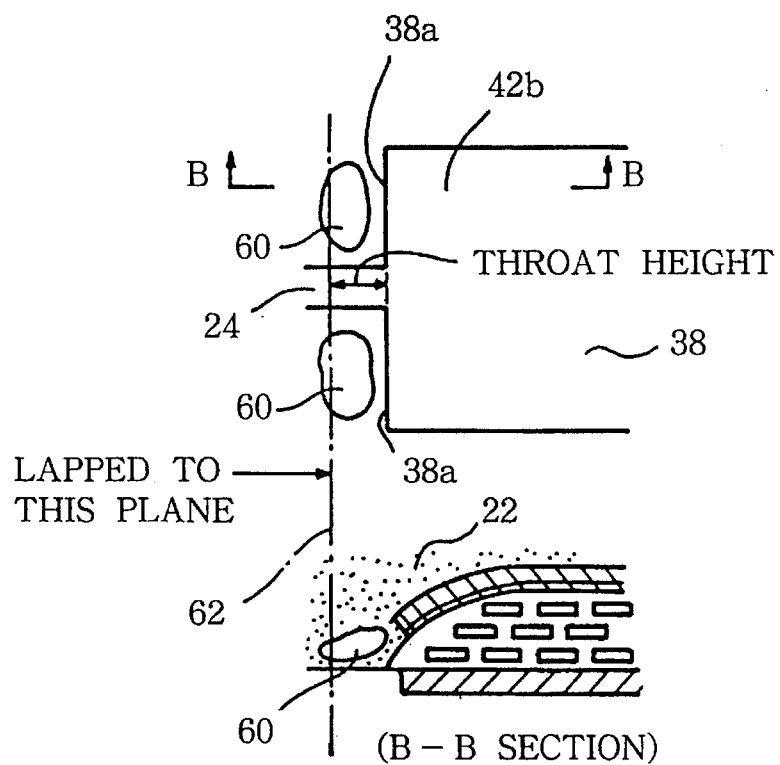
FIG. 7B is a diagram showing schematically generation of voids in a step portion of the upper core portion of the thin film magnetic head of FIGS. 3A to 3C.
Figure 8A:
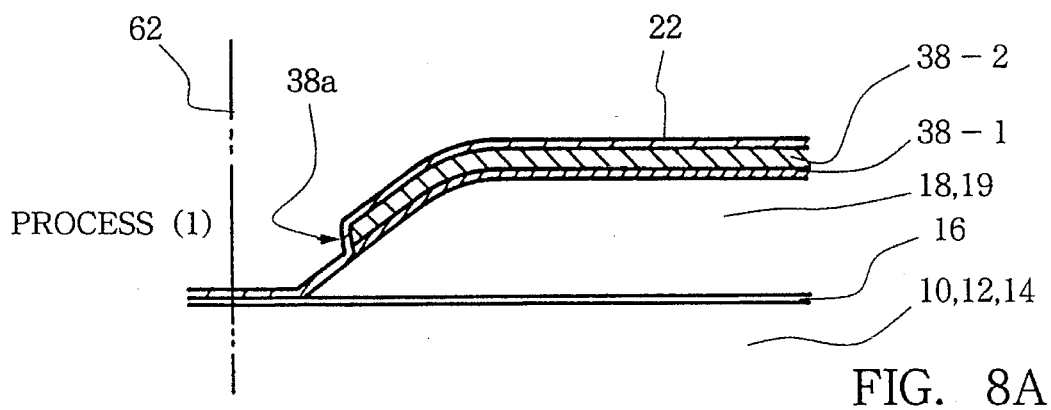
FIGS. 8A to 8G are diagrams showing a process according to which an overcoat layer 22 is formed on an upper core portion 38 shown in FIG. 3 in a case where an end surface 38a nearer to the pole portion of the upper core portion 38 is substantially perpendicular to the surface of a substrate 10.
Figure 8B:
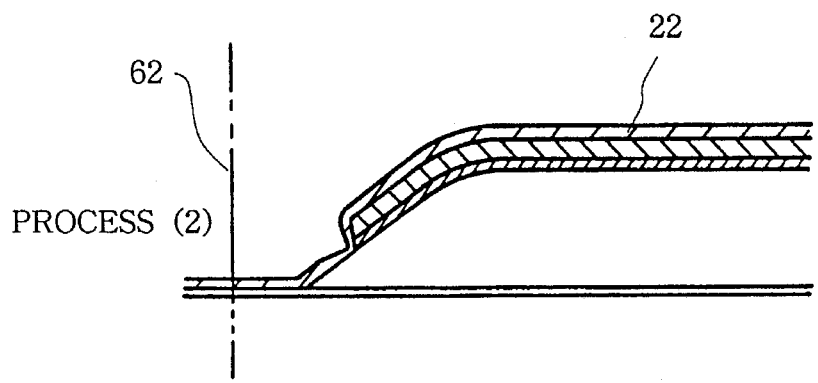
Figure 8C:
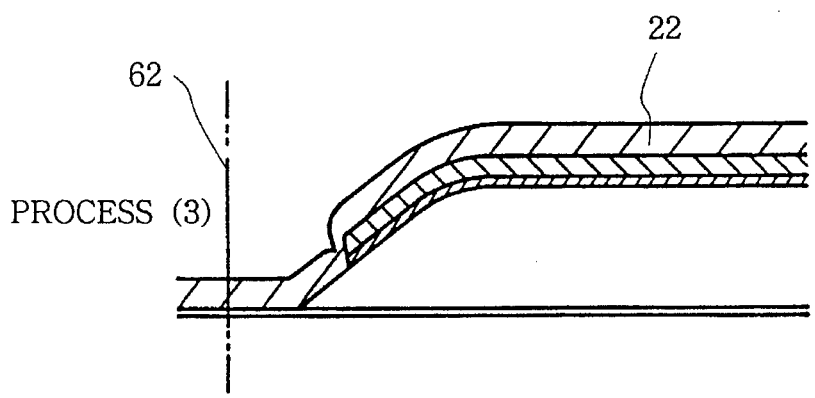
Figure 8D:
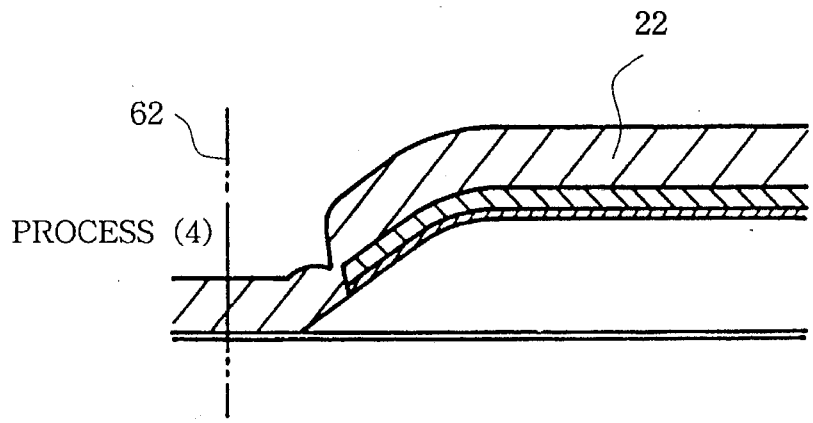
Figures 8E, 8F, 8G:
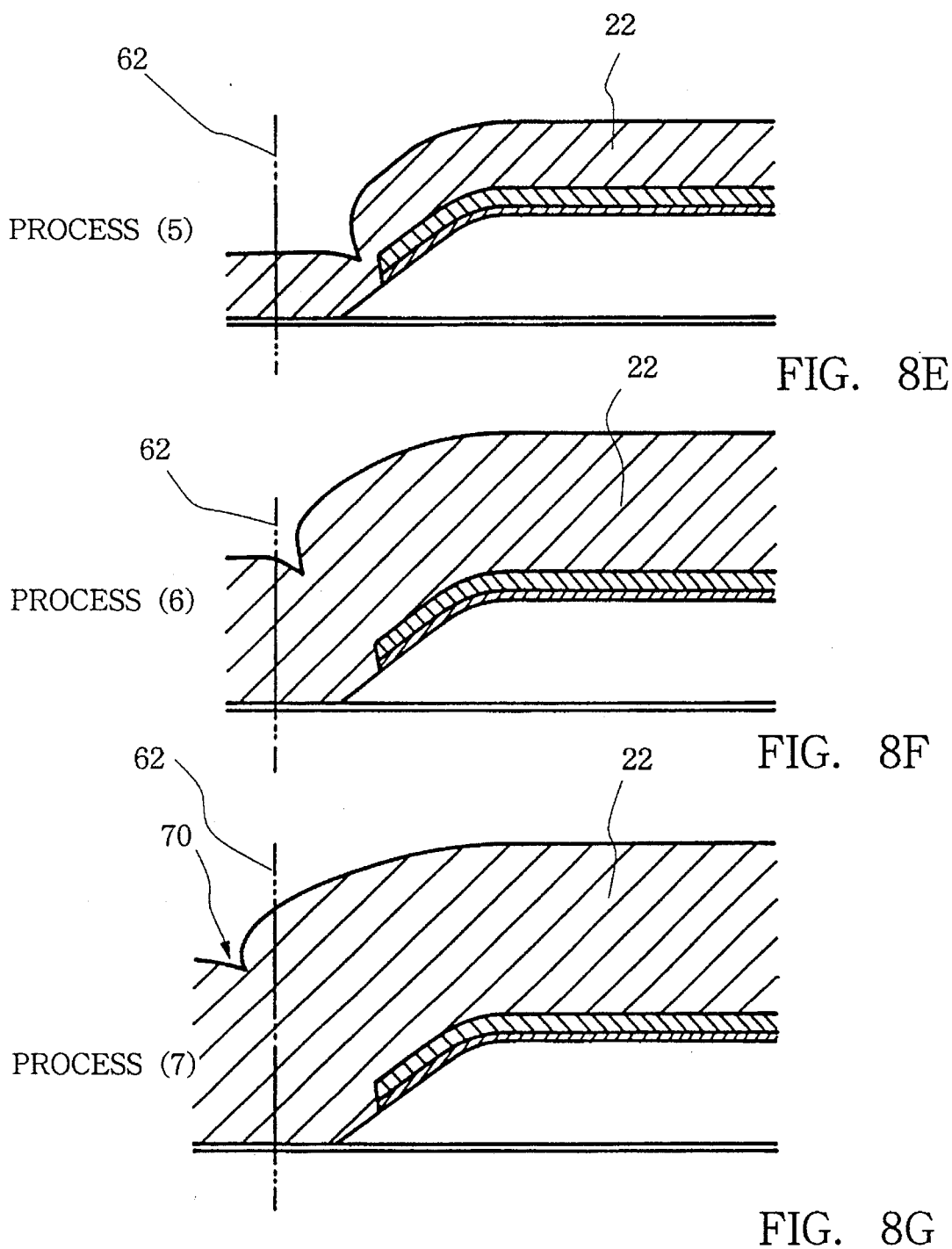
Figure 9A:
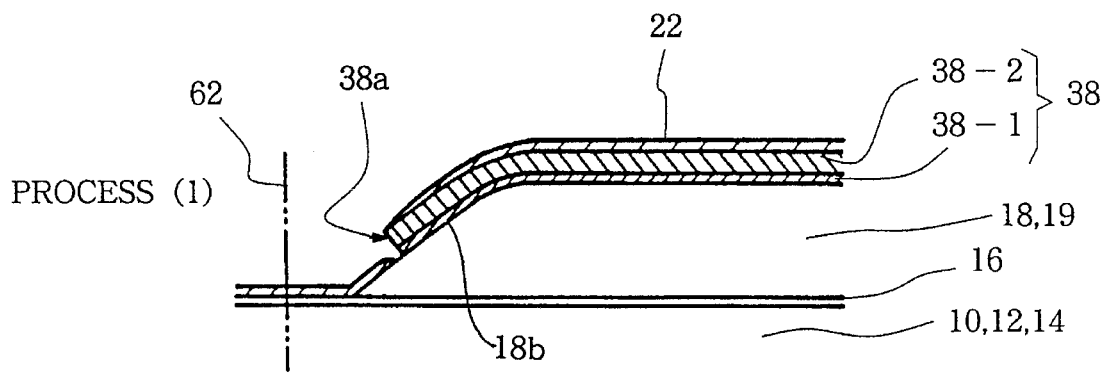
FIGS. 9A to 9G are diagrams showing a process according to which an overcoat layer 22 is formed on an upper core portion 38 shown in FIG. 3 in a case where an end surface 38a nearer to the pole portion is substantially perpendicular to an inclined section-forming portion 18b of an insulating layer 18.
Figure 9B:
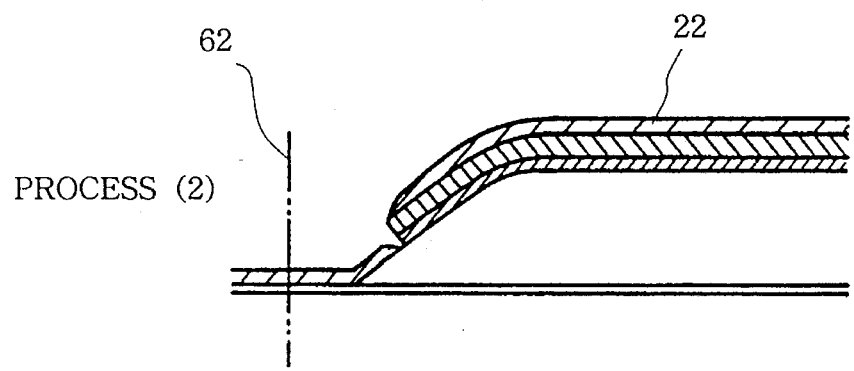
Figure 9C:
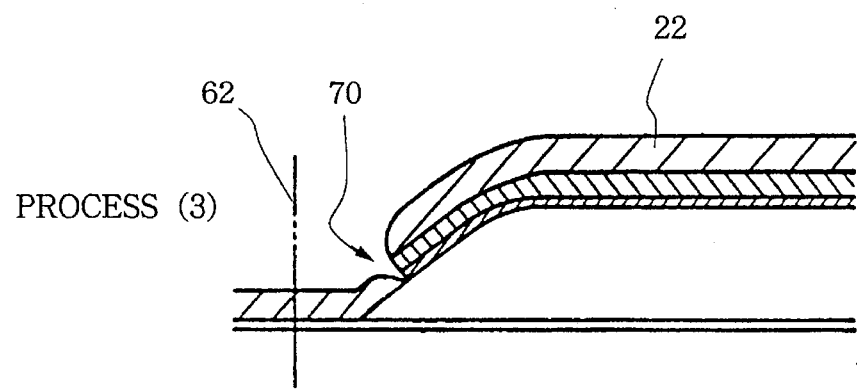
Figure 9D:
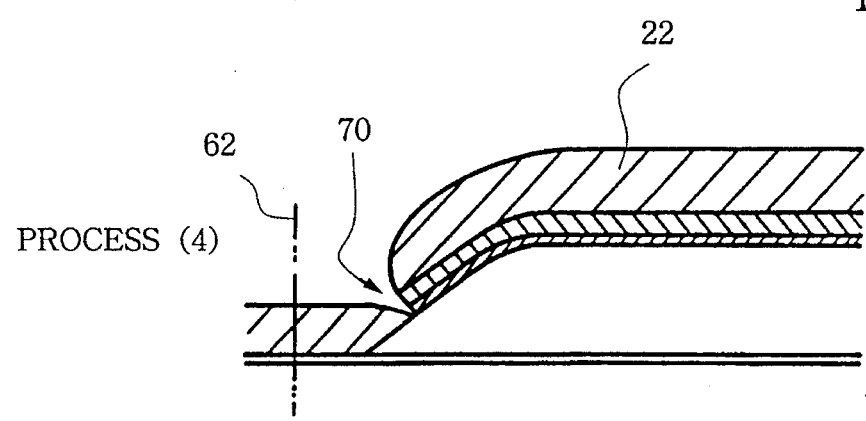
Figure 9E:
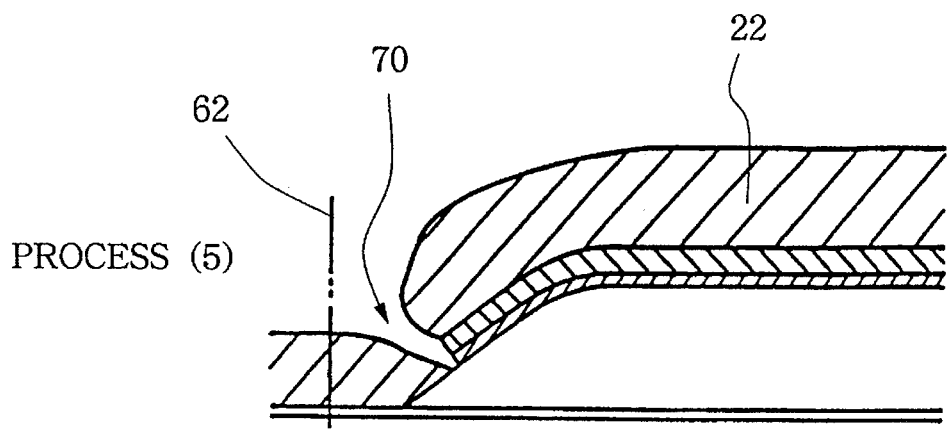
Figure 9F:
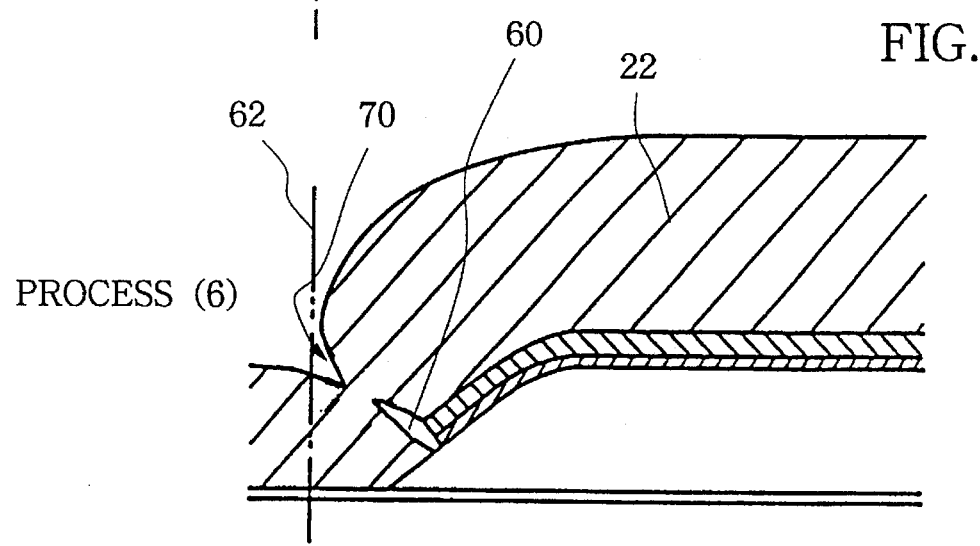
Figure 9G:
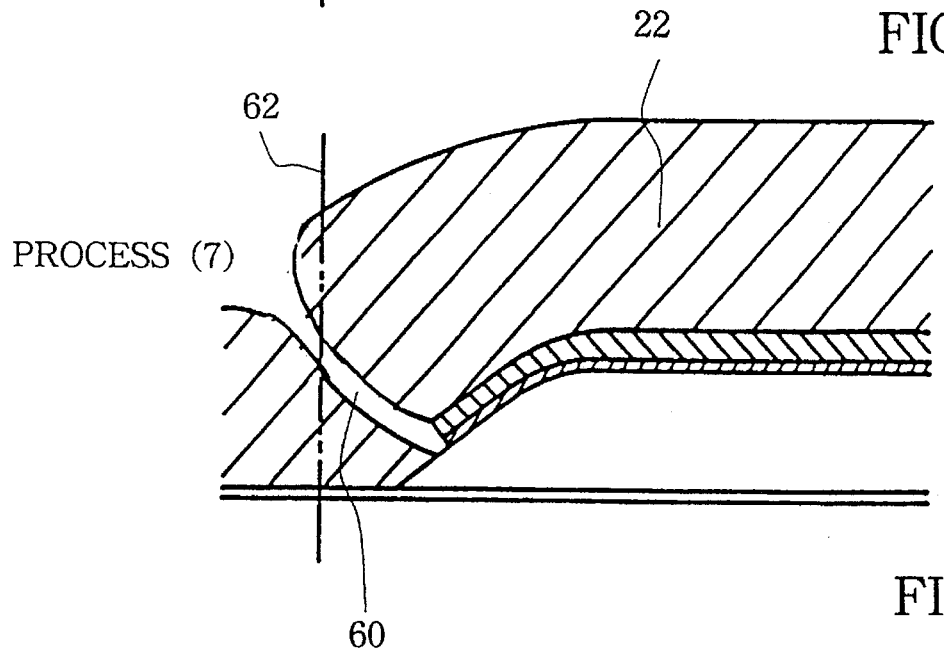
Figure 10A:
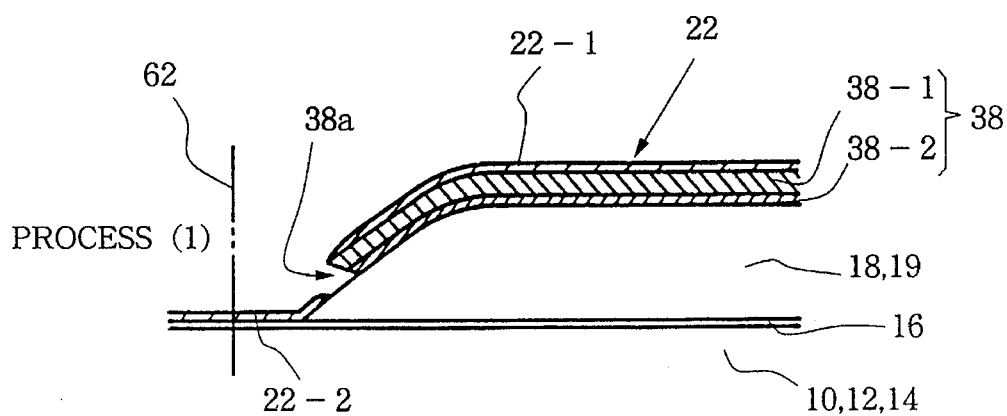
FIG. 10A to 10G are diagrams showing a process according to which an overcoat layer 22 is formed on the upper core portion 38 in a case where an end surface 38a nearer to the pole portion in FIG. 3 has a large overhang.
Figure 10B:
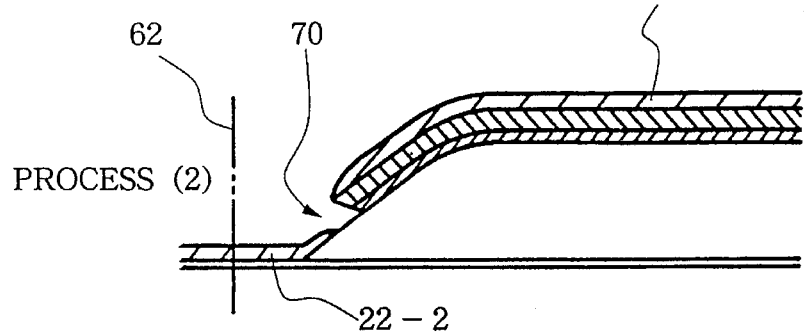
Figure 10C:
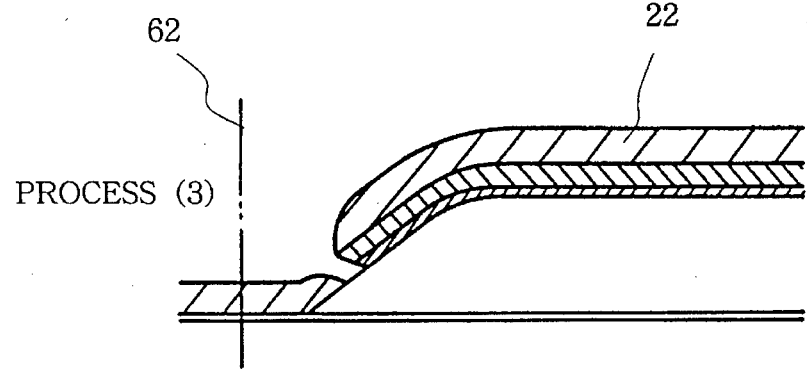
Figure 10D:
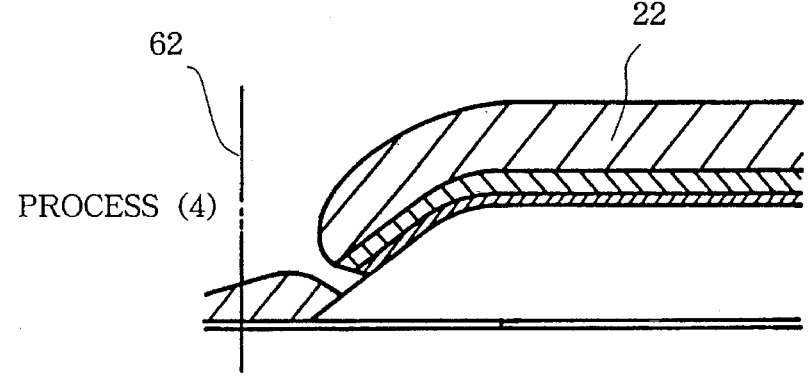
Figure 10E:
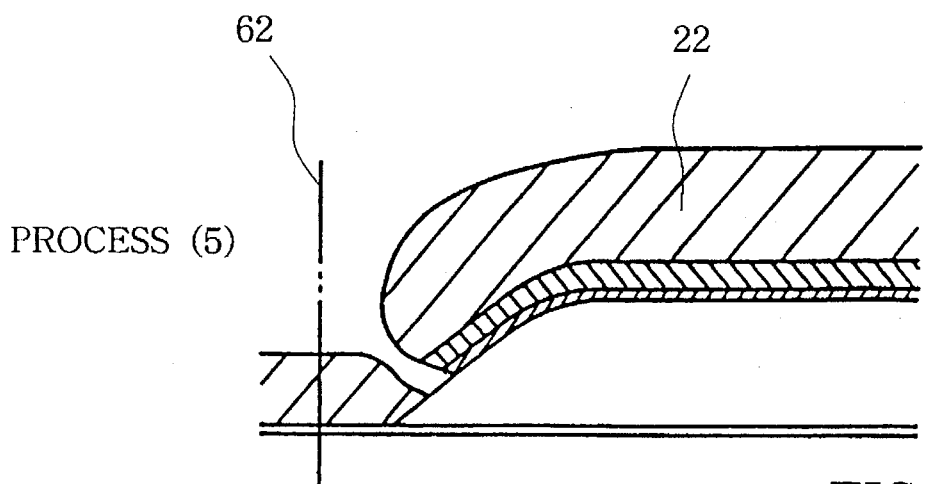
Figure 10F:
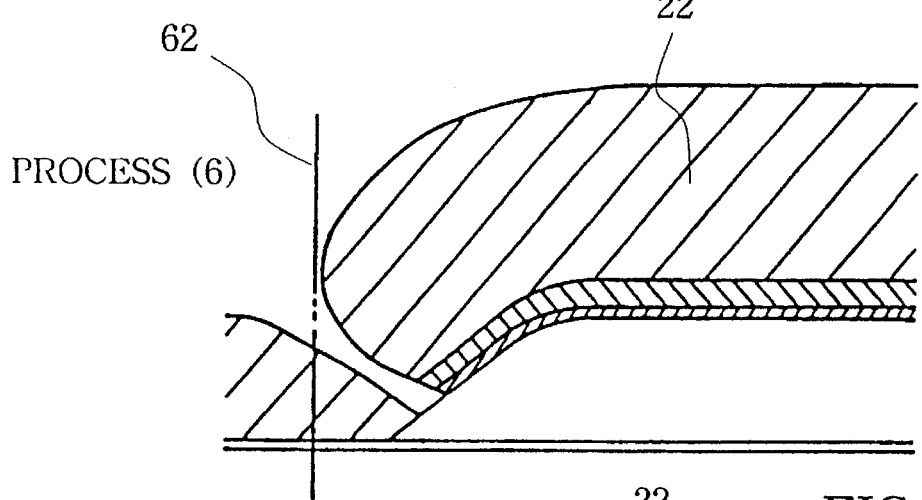
Figure 10G:
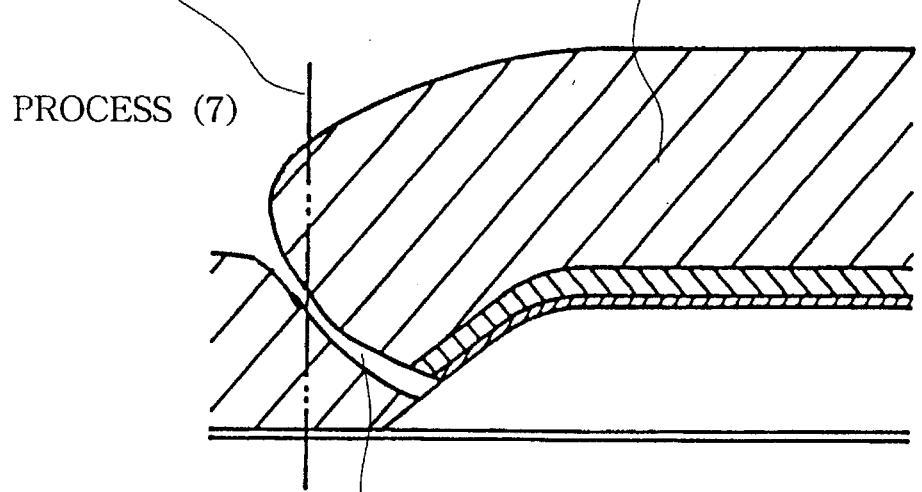

When the first sublayer 38-1 and the second sublayer 38-2 have the same core angle as shown in FIGS. 14A and 14B, the results of measuring wiggle waveform distortion and popcorn noise become as shown in FIGS. 5A and 5B. In this case, both wiggle waveform distortion and popcorn noise vary greatly as the core angle varies.

Other embodiments of the present invention will be described with reference to FIGS. 19 to 27.

FIGS. 19A and 19B show another embodiment of the present invention. In this embodiment, as shown in FIG. 19A, an end surface 38-1a nearer to the pole tip portion of a first sublayer 38-1 of a core portion 38 is formed in a straight line parallel to a second end surface 38-2a nearer to the pole tip portion of a second sublayer 38-2 and receded from the second end surface 38-2a. The end surface 38-1a is located, as shown in FIG. 19B, in the vicinity of a top portion 18a of an insulating layer 18 (at a height of ¾ or ⅘ of the height of the top portion 18a).

FIG. 20 shows another embodiment in which an end surface 38-1a nearer to the pole tip portion of a first sublayer 38-1 of an upper core portion 38 is formed by two catenary curves which are symmetrical with respect to a longitudinal center line of the upper core portion 38.

FIG. 21 shows another embodiment in which a first sublayer 38-1 of an upper core portion 38 is formed with a smaller lateral width than a second sublayer 38-2 and an end surface 38-1a nearer to the pole tip portion of the first sublayer 38-1 is formed in an arcuate form with its core angle (an angle defined by two tangent lines at both ends of the arc) being set at 120 degrees.

Figure 22:
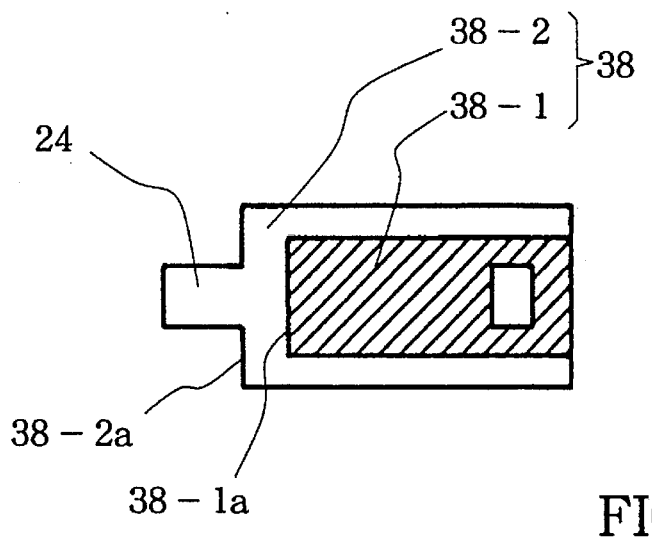
FIG. 22 is a plan view showing another embodiment of the present invention.

FIG. 22 shows another embodiment in which an end surface 38-1a nearer to the pole portion of a first sublayer 38-1 of an upper core portion 38 is formed in a straight line parallel to an end surface 38-2a nearer to the pole tip portion of a second layer 38-2 and the first sublayer 38-1 is formed with a smaller lateral width than the second layer 38-2.

Figure 23:
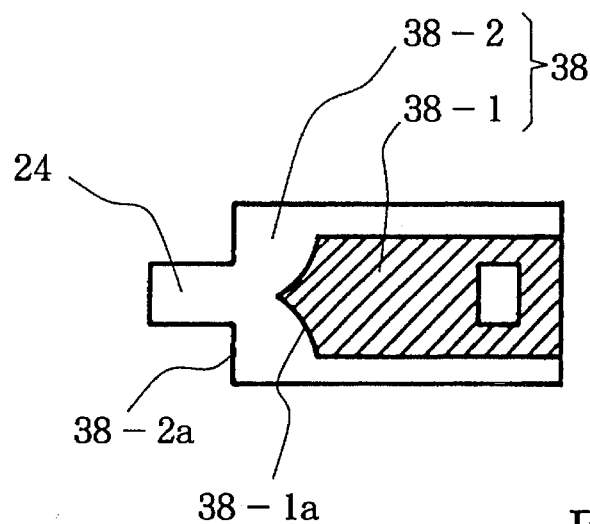
FIG. 23 is a plan view showing another embodiment of the present invention.

FIG. 23 shows another embodiment in which an end surface nearer to the pole portion of a first sublayer 38-1 of an upper core portion 38 is formed with two catenary curves which are symmetrical with respect to a longitudinal center line of the upper core portion 38 and the first sublayer 38-1 is formed with a smaller lateral width than the second sublayer 38-2.

Figure 24:
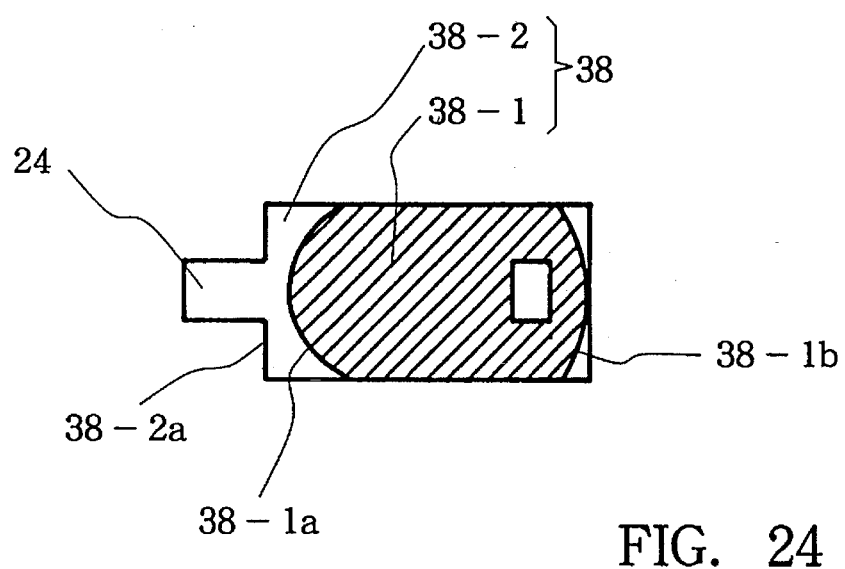
FIG. 24 is a plan view showing another embodiment of the present invention.

FIG. 24 shows another embodiment in which an end surface 38-1a nearer to the pole tip portion of a first sublayer 38-1 of an upper core portion 38 is formed in an arcuate form with its core angle being set at about 120 degrees and an end surface 38-1b remote from the pole tip portion of the first sublayer 38-1 is formed in an arcuate form.

FIGS. 25A and 25B show another embodiment in which an end surface 38-1a nearer to the pole tip portion of a first sublayer 38-1 of an upper core portion 38 is formed in an arcuate form with its core angle being set at 120 degrees and an end surface 38-1b remote from the pole tip portion is projecting rearwardly of a second sublayer 38-2.

FIG. 26 shows another embodiment in which a first layer 38-1 of an upper core portion 38 is formed with a smaller width than a second sublayer 38-2 and an end surface 38-1*a* nearer to the pole tip portion of the first sublayer 38-1 is formed in an arcuate form with its core angle being set at about 120 degrees and an end surface 38-1*b* remote from the pole tip portion of the first sublayer 38-1 is projecting rearwardly of the second layer 38-2.

FIG. 27 shows another embodiment in which a first sublayer 38-1 of an upper core portion 38 is formed with a larger lateral width than a second sublayer 38-2 and an end surface 38-1*a* nearer to the pole tip portion of the first sublayer 38-1 is formed in a straight line parallel to an end surface 38-2*b* nearer to the pole tip portion of the second sublayer 38-2 and is located in the vicinity of a top portion 18*a* of an insulating layer 18 (e.g., at ¾ or ⅘ of the height of the top portion 18*a*). Further, in this embodiment, an end surface 38-1*b* remote from the pole tip portion of the first sublayer 38-1 is projecting rearwardly of the second sublayer 38-2.

Although the present invention has been described in detail herein with reference to its preferred embodiments and certain alternatives, it is to be understood that this description is by way of example only, and it is not be construed in a limiting sense. Although the present invention has been described in some aspects as referring to a laminated upper core layer having two sublayers, it is to be understood that the foregoing invention can be used with three or more sublayers. It is to be further understood that numerous changes in the details of the embodiments of the present invention, and additional embodiments of the present invention, will be apparent to, and may be made by, persons of ordinary skill in the art having reference to this description. It is contemplated that all such changes and additional embodiments are within the spirit and true scope of the present invention as claimed in appended claims.

What is claimed is:

1. A thin film magnetic head having a laminated structure comprising:

a lower core portion provided over a substrate and having a pole portion;

a magnetic gap layer provided on the lower core portion;

an insulating layer provided on the magnetic gap layer and having a top section, a transition portion adjacent to the top section and having an inclined section located below the top section and a skirt portion located below the inclined section;

conduction coils provided in the insulating layer;

an upper core portion provided on the insulating layer; and an overcoat layer provided on the upper core portion;

said upper core portion having a pole tip portion of a reduced width which is opposed to the pole portion of the lower core portion through the magnetic gap layer and whose foremost end portion is opposed to a recording surface of a magnetic medium, and a back region;

said back region including a top-forming portion, of a larger width than the pole tip portion of the upper core portion, formed on the top section of the insulating layer and having side edges formed in parallel to a longitudinal center axis of the pole tip portion, said longitudinal center axis normal to said recording surface, and a transition portion formed on the inclined section of the insulating layer and located between the top-forming portion and the pole tip portion, the improvement comprising that said transition portion of the back region of the upper core portion is made of a plurality of layers and that a core angle of an uppermost layer of the plurality of layers of the back region is set at an angle which is about 120 degrees or larger and is smaller than about 180 degrees, said core angle of said uppermost layer measured in a first plane substantially parallel to a surface of said substrate, and a core angle of a lower layer or layers of the plurality of layers of the back region is set at an angle which is smaller than the core angle of the uppermost layer and is larger than about 60 degrees, said core angle of said lower layer or layers measured in a second plane substantially parallel to the surface of said substrate.

2. The thin film magnetic head of claim 1 wherein the core angle of one of the lower layer or layers is set at about 90 degrees.

3. The thin film magnetic head of claim 1 wherein an end surface, nearer to the pole tip portion, of one of the lower layer or layers does not coincide with an end surface, nearer to the pole tip portion, of the uppermost layer.

4. A thin film magnetic head having a laminated structure comprising:

a lower core portion provided over a substrate and having a pole portion;

a magnetic gap layer provided on the lower core portion;

an insulating layer provided on the magnetic gap layer and having a top section, an inclined section located below the top section and a skirt portion located below the inclined section;

conduction coils provided in the insulating layer;

an upper core portion provided on the insulating layer; and an overcoat layer provided on the upper core portion;

said upper core portion having a pole tip portion of a reduced width which is opposed to the pole tip portion of the lower core portion through the magnetic gap layer and whose foremost end portion is opposed to a recording surface of a magnetic medium, and a back region;

said back region including a top-forming portion, of a larger width than the pole tip portion of the upper core portion, formed on the top section of the insulating layer and having side edges formed substantially in parallel to a longitudinal center axis of the pole tip portion, said longitudinal center axis normal to said recording surface, and a transition portion formed on the inclined section of the insulating layer and located between the top-forming portion and the pole tip portion, the improvement comprising that said transition portion of the back region of the upper core portion is made of a plurality of layers and that a foremost end portion, nearer to the pole tip portion, of a lower layer or layers of the plurality of layers of the back region is located rearwardly of a foremost end portion, nearer to the pole tip portion, of an uppermost layer of the plurality of layers wherein one of the lower layer or layers is formed with a smaller width than a width of the uppermost layer, and an end surface, nearer to the pole tip portion, of said one of the lower layer or layers is formed in a shape selected from a group consisting of two catenary curves which are symmetrical with respect to a longitudinal center line of the upper core portion and an arcuate form.

5. The thin film magnetic head of claim 4 wherein said shape is said arcuate form, and a core angle of said one of the lower layer or layers defined by a pair of tangents to said arcuate form at points of intersection between said arcuate form and said side edges is set at about 120 degrees.

6. The thin film magnetic head of claim 4 wherein said shape is said arcuate form.

7. The thin film magnetic head of claim 4 wherein said shape is said two catenary curves which are symmetrical with respect to said longitudinal center line of the upper core portion.

8. A thin film magnetic head having a laminated structure comprising:

a lower core portion provided over a substrate and having a pole portion;

a magnetic gap layer provided on the lower core portion;

an insulating layer provided on the magnetic gap layer and having a top section, an inclined section located below the top section and a skirt portion located below the inclined section;

conduction coils provided in the insulating layer;

an upper core portion provided on the insulating layer; and an overcoat layer provided on the upper core portion;

said upper core portion having a pole tip portion of a reduced width which is opposed to the pole tip portion of the lower core portion through the magnetic gap layer and whose foremost end portion is opposed to a recording surface of a magnetic medium, and a back region;

said back region including a top-forming portion, of a larger width than the pole tip portion of the upper core portion, formed on the top section of the insulating layer and having side edges formed substantially in parallel to a longitudinal center axis of the pole tip portion, said longitudinal center axis normal to said recording surface, and a transition portion formed on the inclined section of the insulating layer and located between the top-forming portion and the pole tip portion, the improvement comprising that said transition portion of the back region of the upper core portion is made of a plurality of layers and that a foremost end portion, nearer to the pole tip portion, of a lower layer or layers of the plurality of layers of the back region is located rearwardly of a foremost end portion, nearer to the pole tip portion, of an uppermost layer of the plurality of layers wherein an end surface, nearer to the tip pole portion, of one of the lower layer or layers is formed in a shape selected from a group consisting of a straight line substantially parallel to an end surface, nearer to the pole tip portion, of the uppermost layer and an arcuate form, and said one of the lower layer or layers projects rearwardly of the uppermost layer.

9. The thin film magnetic head of claim 8 wherein said one of the lower layer or layers is formed with a smaller width than a width of the uppermost layer, and said shape is said arcuate form.

10. The thin film magnetic head of claim 8 wherein said one of the lower layer or layers is formed with a larger width than a width of the uppermost layer, and said shape is said straight line substantially parallel to said end surface, nearer to the pole tip portion, of the uppermost layer.

11. The thin film magnetic head of claim 8 wherein said shape is said arcuate form.

12. A thin film magnetic head for electrically inducing a magnetic flux in conductive coils, comprising:

(a) a substrate;

(b) a lower magnetic layer formed over the substrate;

(c) a non-magnetic layer formed on the lower magnetic layer;

(d) conductive coils formed over the non-magnetic layer: and (e) an upper magnetic layer having a pole tip region and a back region, said back region having a transition region having a slanted surface and a top region, the upper magnetic layer including:

(e-1) a first magnetic sublayer located only in the back region, wherein a transition edge of the first magnetic sublayer is located in the transition region; and (e-2) a second magnetic sublayer formed on the first magnetic sublayer and having a pole tip portion in the pole tip region and a back portion having a larger width than a width of the pole tip portion, the back portion having a transition edge located in the transition region, wherein the transition edge of the first magnetic sublayer is receded with respect to the transition edge of the second magnetic sublayer wherein a first width of the first magnetic sublayer is larger than a second width of the second magnetic sublayer.

13. The thin film magnetic head of claim 12 including:

(f) a protective layer formed on the upper magnetic layer.

14. The thin film magnetic head of claim 13 wherein the protective layer has a flat air-beating surface coplanar with an edge of the pole tip portion.

15. The thin film magnetic head of claim 12 wherein an air-bearing surface of the thin film magnetic head is depression-free.

16. The thin film magnetic head of claim 12 wherein the conductive coils are made of copper.

17. The thin film magnetic head of claim 12 wherein the conductive coils are multilevel conductive coils.

18. The thin film magnetic head of claim 17 including:

(g) multilevel insulating layers for insulating the multilevel conductive coils.

19. The thin film magnetic head of claim 12 wherein the non-magnetic layer is made of a material selected from a group consisting of $SiO_2$ and $Al_2O_3$.

20. The thin film magnetic head of claim 12 wherein a core angle of the transition edge of the second magnetic sublayer is in a range from about 120 degrees to about 180 degrees, said core angle measured in a plane substantially parallel to said substrate.

* * * * *